(12) United States Patent
Ghosh et al.

(10) Patent No.: US 10,461,577 B2
(45) Date of Patent: Oct. 29, 2019

(54) INVERTER PARALLELING CONTROL SYSTEM AND METHOD

(71) Applicant: SCHNEIDER ELECTRIC IT CORPORATION, West Kingston, RI (US)

(72) Inventors: Rajesh Ghosh, West Bengal (IN); Mudiyula Srikanth, Bangalore (IN); Damir Klikic, Waltham, MA (US); Mahendrakumar H. Lipare, Bangalore (IN); Nikhill Onthath, Kozhikode (IN)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 150 days.

(21) Appl. No.: 15/684,450

(22) Filed: Aug. 23, 2017

(65) Prior Publication Data

US 2019/0067988 A1    Feb. 28, 2019

(51) Int. Cl.
*H02J 9/06*    (2006.01)
*H02M 1/12*    (2006.01)
(Continued)

(52) U.S. Cl.
CPC .............. *H02J 9/062* (2013.01); *H02M 1/12* (2013.01); *H02M 1/14* (2013.01); *H02J 3/34* (2013.01); *H02M 2007/4822* (2013.01)

(58) Field of Classification Search
CPC .... H02J 9/06; H02J 9/061; H02J 9/062; H02J 3/38; H02J 3/382; H02J 3/1878;
(Continued)

(56) References Cited

U.S. PATENT DOCUMENTS 7,577,006 B2    8/2009  Neacsu
9,705,360 B2 *  7/2017  Kolhatkar ................. G05F 3/02
(Continued)

FOREIGN PATENT DOCUMENTS

CN    105553086 A        5/2016
EP       2919363 A1 *   9/2015    ............... G05F 3/02
(Continued)

OTHER PUBLICATIONS

Candorkar, M. C. et al., "Control of Parallel Connected Inverters in Standalone ac Supply Systems," IEEE Transactions on Industry Applications, vol. 29, No. 1, Jan./Feb. 1993, pp. 136-143.
(Continued)

*Primary Examiner* — Fritz M Fleming
*Assistant Examiner* — Jagdeep S Dhillon
(74) *Attorney, Agent, or Firm* — Lando & Anastasi, LLP

(57) ABSTRACT

According to one aspect, embodiments of the invention provide a UPS system comprising an input, an output, a converter, an inverter configured to convert DC power into output AC power, and a controller configured to operate the inverter to introduce a voltage droop to the output AC power, wherein the controller includes an active power droop controller including a first moving average filter configured to sample instantaneous active power of the inverter to obtain instantaneous active power samples and calculate a first DC component of the instantaneous active power samples, and a first Min-Max filter configured to receive the first DC component of the instantaneous active power samples and output a second DC component of the instantaneous active power samples having a convergence time less than the first DC component, wherein the active power droop controller is configured to calculate the voltage droop based on the second DC component.

20 Claims, 19 Drawing Sheets

(51) Int. Cl.
*H02M 1/14* (2006.01)
*H02J 3/34* (2006.01)
*H02M 7/48* (2007.01)

(58) Field of Classification Search
CPC .............. H02M 1/12; H02M 1/14; H02M 1/16; H01H 85/46; H01H 85/48; H01H 85/44; H02H 3/05; H02H 3/07
USPC .......................................................... 307/65
See application file for complete search history.

(56) References Cited

U.S. PATENT DOCUMENTS

| | | | |
|---|---|---|---|
| 9,735,615 B2 * | 8/2017 | Colombi | H02J 9/061 |
| 2015/0244210 A1 * | 8/2015 | Kolhatkar | G06F 1/26 |
| | | | 307/23 |
| 2016/0118847 A1 * | 4/2016 | Colombi | H02M 1/34 |
| | | | 307/65 |
| 2016/0204611 A1 | 7/2016 | Chambon | |
| 2017/0163037 A1 * | 6/2017 | Zimmanck | H02J 3/1878 |
| 2017/0229857 A1 * | 8/2017 | Kral | H02J 3/382 |
| 2017/0235322 A1 * | 8/2017 | Rahmani | G05F 1/66 |
| | | | 700/295 |
| 2018/0076658 A1 * | 3/2018 | Mannuccini | H02J 9/061 |
| 2018/0076659 A1 * | 3/2018 | Giuntini | H02H 3/05 |

FOREIGN PATENT DOCUMENTS

| | | | |
|---|---|---|---|
| EP | 2919363 A1 | 9/2015 | |
| EP | 2975728 A1 * | 1/2016 | ............. H02J 9/061 |
| EP | 2975728 A1 | 1/2016 | |

OTHER PUBLICATIONS

Simpson-Porco, J.W. et al., "Synchronization and Power Sharing for Droop-Controlled Inverters in Islanded Microgrids," arXiv:1206.5033v3 [math.OC] Feb. 21, 2013, 11 pages.
Extended European Search Report from corresponding European Application No. 18190346.9 dated Sep. 24, 2018.

* cited by examiner

INVERTER PARALLELING CONTROL SYSTEM AND METHOD

BACKGROUND OF THE INVENTION

1. Field of Invention

At least some embodiments described herein relate generally to Uninterruptible Power Supplies (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's, as well as others. On-line UPS's provide conditioned AC power as well as back-up AC power upon interruption of a primary source of AC power. Off-line UPS's typically do not provide conditioning of input AC power, but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

A conventional online UPS rectifies input power provided by an electric utility using a Power Factor Correction circuit (PFC) to provide power to a DC bus. The rectified DC voltage is typically used to charge a battery while mains power is available, as well as to provide power to the DC bus. In the absence of mains power, the battery provides power to the DC bus. From the DC bus, an inverter generates an AC output voltage to the load. Since the DC bus is powered either by mains or the battery, the output power of the UPS is uninterrupted if the mains fails and the battery is sufficiently charged. Typical online UPS's may also operate in a bypass mode where unconditioned power with basic protection is provided directly from an AC power source to a load via a bypass line.

To provide enhanced scalability and/or redundancy, two or more UPS's may be electrically connected to form a single parallel UPS system with one output. In such a system, the combination of multiple UPS's may provide increased power capacity to a load attached to the parallel UPS system. Also, if one of the UPS's coupled in parallel fails, the other UPS's coupled in parallel may backup for the failed UPS.

SUMMARY

At least one aspect of the invention is directed to an Uninterruptible Power Supply (UPS) system comprising an input configured to be coupled to an AC source and to receive input AC power from the AC source, an output configured to provide output AC power to a load, a converter coupled to the input and configured to convert the input power into DC power, an inverter having an inverter output coupled to the output of the UPS, the inverter configured to convert the DC power into the output AC power and provide the output AC power to the output, and a controller configured to operate the inverter to introduce a voltage droop to the output AC power, wherein the controller includes an active power droop controller coupled to the inverter output, the active power droop controller including a first moving average filter configured to sample instantaneous active power of the inverter to obtain instantaneous active power samples and calculate a first DC component of the instantaneous active power samples, and a first Min-Max filter configured to receive the first DC component of the instantaneous active power samples from the first moving average filter and output a second DC component of the instantaneous active power samples having a convergence time less than a convergence time of the first DC component, wherein the active power droop controller is configured to calculate the voltage droop based on the second DC component.

According to one embodiment, the controller is further configured to operate the inverter to introduce a frequency droop to the output AC power, and the controller includes a reactive power droop controller coupled to the inverter output, the reactive power droop controller including a second moving average filter configured to sample instantaneous reactive power of the inverter to obtain instantaneous reactive power samples and calculate a first DC component of the instantaneous reactive power samples, and a second Min-Max filter configured to receive the first DC component of the instantaneous reactive power samples from the second moving average filter and output a second DC component of the instantaneous reactive power samples having a convergence time less than a convergence time of the first DC component from the second moving average filter, and wherein the reactive power droop controller is configured to calculate the frequency droop based on the second DC component of the second Min-Max filter.

According to another embodiment, the controller further includes a voltage reference generation module configured to generate a sine wave signal and a cosine wave signal based on a first DC reference signal corresponding to a base frequency reference and a second DC reference signal corresponding to a base peak voltage reference. In one embodiment, the active power droop controller is further configured to calculate the instantaneous active power samples based on the sine wave signal received from the reference generation module and instantaneous current measured at the inverter output. In another embodiment, the active power droop controller is further configured to calculate an active power droop coefficient based on a desired voltage droop and a rated active power output of the inverter, and calculate the voltage droop by multiplying the second DC component of the instantaneous active power samples by the active power droop coefficient.

According to one embodiment, the reactive power droop controller is further configured to calculate the instantaneous reactive power samples based on the cosine wave signal received from the reference generation module and the instantaneous current measured at the inverter output. In one embodiment, the reactive power droop controller is further configured to calculate a reactive power droop coefficient based on a desired frequency droop and a rated reactive power output of the inverter, and calculate the frequency droop by multiplying the second DC component of the instantaneous reactive power samples by the reactive power droop coefficient.

According to another embodiment, the controller is further configured to introduce a virtual output resistance to the output. In one embodiment, in introducing the virtual output resistance to the output the controller is further configured to calculate an instantaneous voltage drop of the inverter based on instantaneous current measured at the output of the UPS and a virtual resistance value, and subtract the instantaneous voltage drop from the sine wave signal. In another embodiment, the controller further includes a drop compensation controller configured to compensate the output AC power for distortion due to a nonlinear load coupled to the output. In one embodiment, in compensating the output AC power for distortion due to a nonlinear load, the drop compensation controller is further configured to store an instantaneous sampled inverter output voltage error in a buffer over a complete fundamental cycle, and add the stored error voltage to the sine wave signal in a subsequent fundamental cycle.

According to one embodiment, the controller further includes a circulating current prevention controller configured to minimize DC circulating current of the inverter. In one embodiment, the UPS system further comprises a DC bus coupled to the converter and configured to receive the DC power from the converter, and the controller further includes a reverse power prevention controller configured to monitor the DC bus for an overvoltage condition, and in response to identifying the overvoltage condition on the DC bus, add an overvoltage offset to the sine wave signal. In another embodiment, the controller further includes an output synchronization module configured to turn on the inverter and, in response to turning on the inverter, synchronize the inverter to a load bus coupled to the output.

Another aspect of the invention is directed to a method for operating a UPS system comprising an input configured to be coupled to a power source, an output, a DC bus, and an inverter coupled to the DC bus, the method comprising receiving input power from the power source, maintaining DC power on the DC bus, converting, with the inverter, the DC power from the DC bus into output AC power, providing the output AC power to the output, and introducing a voltage droop and a frequency droop to the output AC power, wherein introducing the voltage droop and the frequency droop to the output AC power includes sampling instantaneous active power of the inverter to obtain instantaneous active power samples, calculating a first DC component of the instantaneous active power samples, filtering the first DC component of the instantaneous active power samples to generate a second DC component of the instantaneous active power samples, the second DC component of the instantaneous active power samples having a convergence time less than that of the first DC component of the instantaneous active power samples, calculating the voltage droop based on the second DC component of the instantaneous active power samples, sampling instantaneous reactive power of the inverter to obtain instantaneous reactive power samples, calculating a first DC component of the instantaneous reactive power samples, filtering the first DC component of the instantaneous reactive power samples to generate a second DC component of the instantaneous reactive power samples, the second DC component of the instantaneous reactive power samples having a convergence time less than that of the first DC component of the instantaneous reactive power samples, and calculating the frequency droop based on the second DC component of the instantaneous reactive power samples.

According to one embodiment, the method further comprises introducing a virtual output resistance to the output. In one embodiment, the method further comprises compensating the output AC power for distortion due to a nonlinear load coupled to the output. In another embodiment, the method further comprises minimizing DC circulating current of the inverter. In one embodiment, the method further comprises turning on the inverter, and in response to turning on the inverter, synchronizing the inverter to a load bus coupled to the output.

At least one aspect of the invention is directed to a parallel UPS system comprising an AC input mains bus configured to be coupled to an AC source, an output bus configured to be coupled to a load, a plurality of Uninterruptible Power Supplies (UPS), each UPS including, an input configured to be coupled to the AC input mains bus and to receive input AC power from the AC source, an output coupled to the output bus and configured to provide output AC power to the load, a converter coupled to the input and configured to convert the input power into DC power, a DC bus coupled to the converter and configured to receive the DC power from the converter, and an inverter coupled to the DC bus and having an inverter output coupled to the output of the UPS, the inverter configured to convert the DC power from the DC bus into the output AC power and provide the output AC power to the output, and means for sharing power provided to the load between the plurality of Uninterruptible Power Supplies by introducing a voltage droop and a frequency droop to the output AC power of each UPS.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
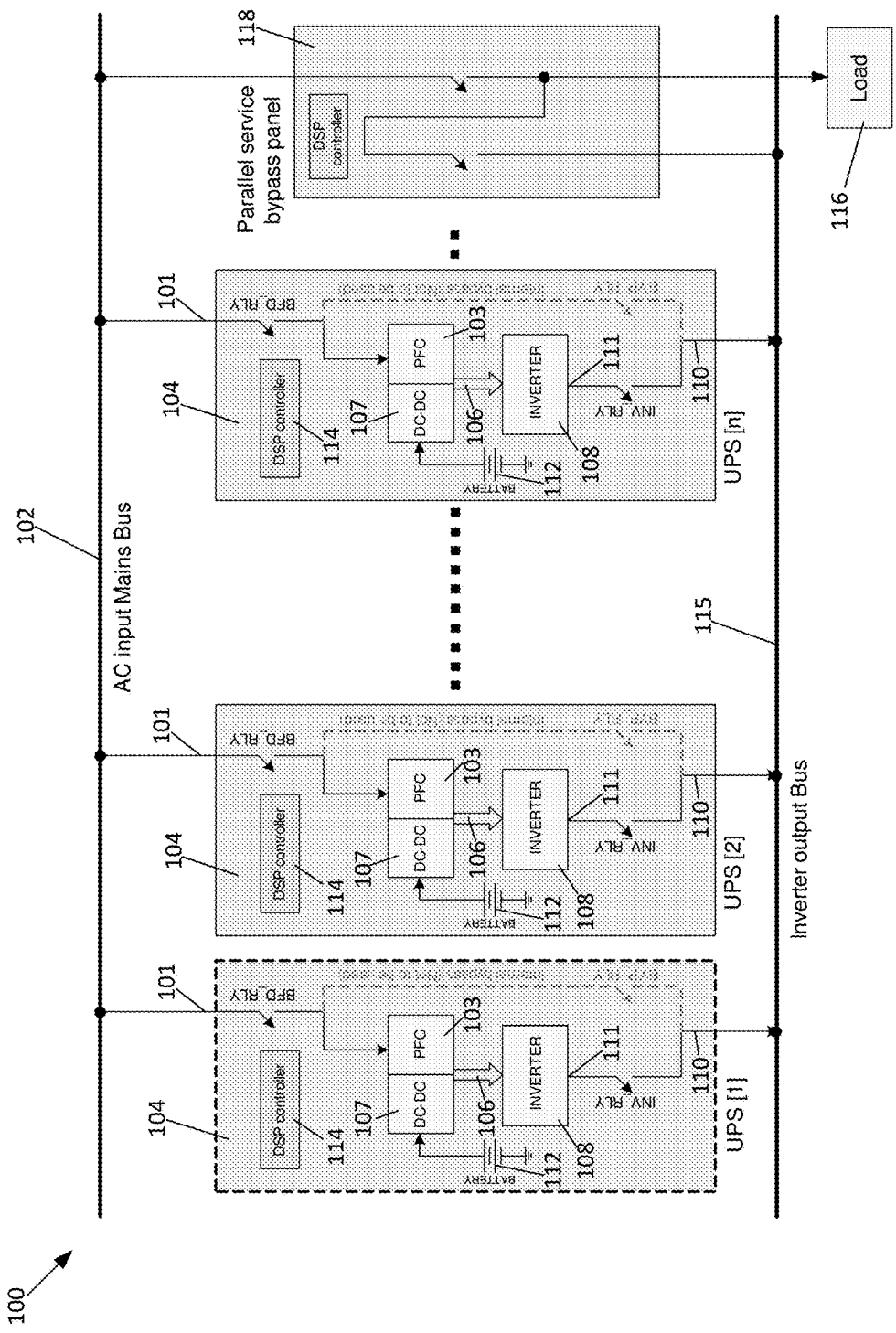
FIG. 1 is a block diagram of a parallel UPS system according to aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

In parallel UPS systems, the inverters of two or more UPS's may be electrically connected to form a single parallel UPS system with one output that may offer several advantage such as power enhancement capability, modularity, n+1 redundancy, reliability, and ease of maintenance. One typical solution for controlling such a parallel UPS system is a Master-Slave control system with analog signal communication. In a Master-Slave control system, one inverter is configured as the Master, while the other inverters in the system are configured as Slaves. The Master inverter controls the output voltage of the system while the Slave inverters equally share the load current. In one traditional Master-Slave control system, the Master inverter sends a current reference signal to all Slave inverters. In another traditional Master-Slave control system, the Master inverter only controls the output voltage of the system while the Slave inverters determine their desired current reference based on the load current and the number of healthy inverters in the system.

The traditional Master-Slave control systems discussed above may have a variety of drawbacks. For example, where the Master inverter sends a current reference to all of the Slave inverters, communication is required between the Master inverter and each Slave inverter. Where the Slave inverters determine their desired current reference based on the load current and the number of healthy inverters in the system, analog load current information typically must be sent to each Slave inverter and each Slave inverter must typically also know the number of healthy inverters currently sharing the load. Additionally, in a Master-Slave control system, a number of additional high-speed Digital Signal Processor (DSP) General Purpose Input and Output (GPIO) signals need to be communicated between the inverters to realize Master-Slave control. Accordingly, complex communication between inverters in the system is typically required, particularly when the number of units in the system exceeds two.

Another typical solution for controlling a parallel UPS system that may address some of the drawbacks of a Master-Slave control system is a droop control system. In a typical droop control system, virtual impedances are introduced at the output of each inverter in the system to drive current/power sharing between paralleling inverters. These virtual output impedances provide the necessary droop in each inverter's output voltage and frequency, based on the average active and reactive output power or instantaneous current, to drive proper load sharing. The virtual impedance can be resistive, inductive, or both. In a typical droop control system, no control signals between inverters are required.

However, the traditional droop control methods discussed above may suffer from a variety of drawbacks. For example, droop control, despite its capability to provide load sharing between UPSs without control communication, may compromise amplitude and frequency output voltage regulation for power sharing accuracy. In addition, droop control systems generally require fast computation of the DC/average value of the instantaneous output active and reactive power of each inverter, which may have large second harmonic ripple (particularly in single-phase applications). Low pass filters, having low cutoff frequency and slow response time, are typically used in conventional droop control systems. Such filters may result in poor dynamic current sharing between inverters. As a result, large circulating currents may flow between the inverter units for a relatively long period of time after a disturbance (e.g., a load change or a unit trips). Droop control based systems may also suffer from a lack in DC offset control, a lack in active power reverse flow protection, and load drops.

As described herein, a new droop control system and method for paralleling multiple inverters with no inverter control interconnections is provided in at least some embodiments. The droop control system and method described herein includes a droop system architecture configured to deal with the traditional droop control drawbacks described above. More specifically, the droop control system and method described herein can offer faster dynamic load sharing response, improved output voltage regulation and low voltage Total Harmonic Distortion (THD), DC bus overvoltage control at light/no load, DC circulating current control, and/or improved synchronization to load bus control. The droop control system and method described herein can also handle both high and low output impedances and is suitable for both analog and digital implementation.

FIG. 1 is a block diagram of a parallel UPS system 100 according to aspects described herein. The parallel UPS system 100 includes an AC input Mains bus 102, a plurality ([n]) of UPS systems 104, and an inverter output bus 115. Each UPS system 104 includes an input 101, a converter 103, a DC bus 106, an inverter 108, an output 110, a battery 112, and a controller 114. The input 102 is configured to be coupled to the AC input Mains bus 102 and is also coupled to the converter 103. The DC bus 106 is coupled between the converter 103 and the inverter 108. The output 110 is coupled to an output 111 of the inverter 108. The output 110 is also configured to be coupled to the inverter output bus 115 and the inverter output bus 115 can be coupled to a load 116. The battery 112 is coupled to the DC bus 106 via a DC-DC converter 107. The controller 114 is configured to monitor the input 101, the output 110, the converter 103, the DC bus 106, and/or the inverter 108.

In each UPS 104, the controller 114 is configured to monitor the input AC power received by the input 101 from the AC input Mains bus 102 and to operate the UPS 104 in different modes of operation based on the status of the received input AC power. When AC power provided to the input 101 is acceptable (i.e., above an input power threshold), the controller 114 operates the UPS 104 in a normal mode of operation. In the normal mode of operation, AC power from the input 101 is provided to the converter 103. According to one embodiment, the converter 103 is a Power Factor Correction (PFC) converter 103; however, in other embodiments, other types of converters may be utilized. The controller 114 operates the converter 103 to convert the AC power into DC power and provide the DC power to the DC bus 106. In at least one embodiment, DC power is provided from the DC bus 106 to the DC-DC converter 107 and the DC-DC converter regulates the received DC power and provides the regulated DC power to the battery 112 to charge the battery 112. In the normal mode of operation, the inverter 108 receives DC power from the DC bus 106, and the controller 114 operates the inverter 108 to convert the DC power into regulated AC power and provide regulated AC power to the load 116 via the output 110 and the inverter output bus 115.

In each UPS 104, when AC power provided to the input 101 is not acceptable (i.e., below an input power threshold), the controller 114 operates the UPS 104 in a backup mode of operation. In the backup mode of operation, DC power from the battery 112 is regulated (e.g., by the DC/DC converter 107) and provided to the DC bus 106. The inverter 108 receives the DC power from the DC bus 106, and the controller 114 operates the inverter 108 to convert the DC power into regulated AC power and provide the regulated AC power to the load 116 via the output 110 and the inverter output bus 115.

According to at least one embodiment, the parallel UPS system 100 further includes a bypass panel 118 that is configured to selectively couple the inverter output bus 115 to the load 116 (e.g., in the normal and backup modes of operation) and selectively couple the AC input Mains Bus 102 directly to the load 116 in a bypass mode of operation where the controller 114 determines that the conditioning of input AC power is not necessary and that the input AC power should be provided directly to the load 116.

Figure 2:
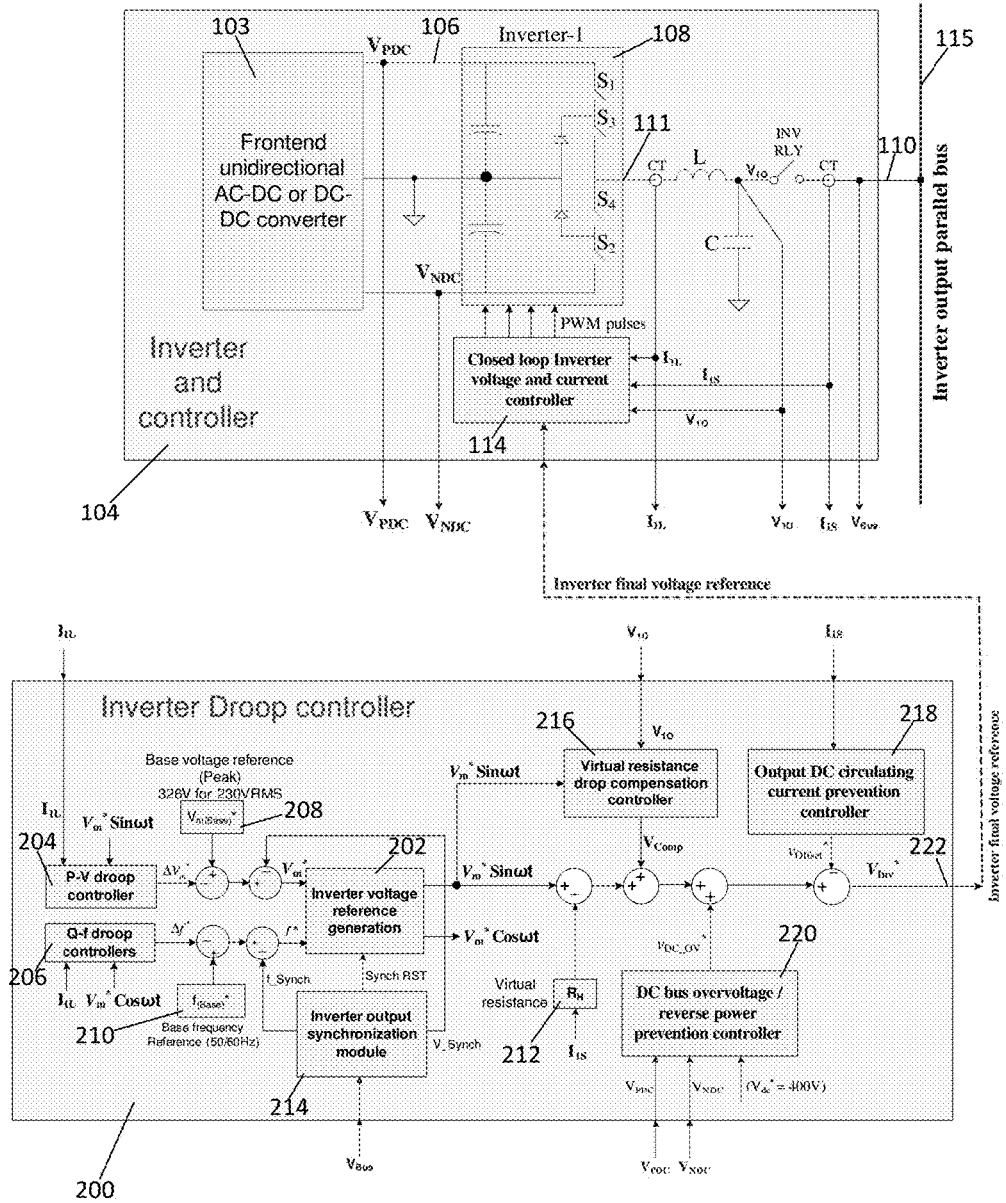
FIG. 2 is a block diagram illustrating a droop controller according to aspects described herein.

FIG. 2 is a block diagram illustrating a droop controller 200 of the UPS 104. As shown in FIG. 2, the droop controller 200 is coupled to the controller 114. The droop controller 200 includes an inverter voltage reference generation module 202, an active power sharing droop controller 204, a reactive power sharing droop controller 206, a base voltage reference 208, a base frequency reference 210, a virtual resistance 212, an output synchronization module 214, a drop compensation controller 216, a circulating current prevention controller 218, a DC bus overvoltage/reverse power prevention controller 220, and an output 222. The output of the droop controller 200 is configured to communicate with a closed loop inverter voltage and current controller (e.g., the controller 114 discussed above with respect to FIG. 1) of the UPS 104. In one embodiment, the droop controller 200 is separate from the closed loop inverter voltage and current controller 114; however, in other embodiments, functions of the droop controller 200 are implemented by the controller 114. The closed loop inverter voltage and current controller 114 can be implemented with either an analog or digital platform to realize a low output impedance.

The droop controller 200 provides information to the closed loop inverter voltage and current controller 114 such that the closed loop inverter voltage and current controller 114 can operate the UPS 104 (i.e., the inverter 108 of the UPS 104) in parallel with the other UPS's in the system 100. The droop controller 200 operates without requiring inter-UPS communications and generates an inverter final voltage reference $V_{Inv}*$ which is provided to the closed loop inverter voltage and current controller 114. Based on the inverter final voltage reference $V_{Inv}*$ received from the droop controller 200, the closed loop inverter voltage and current controller 114 operates the inverter 108 to introduce voltage and frequency droop at the output of the inverter 108 such that the inverter 108 can properly share current/power provided to the load 116 with other inverters to which it is coupled in parallel. The droop controller 200 also includes a variety of different modules/controllers to configure the inverter final voltage reference $V_{Inv}*$ to compensate for traditional droop control drawbacks described above. According to one embodiment, the droop controller 200 is implemented in a digital platform; however, in other embodiments, the droop controller 200 is implemented with a different type of platform. Operation of the droop controller 200 is discussed in detail below.

Figure 3:
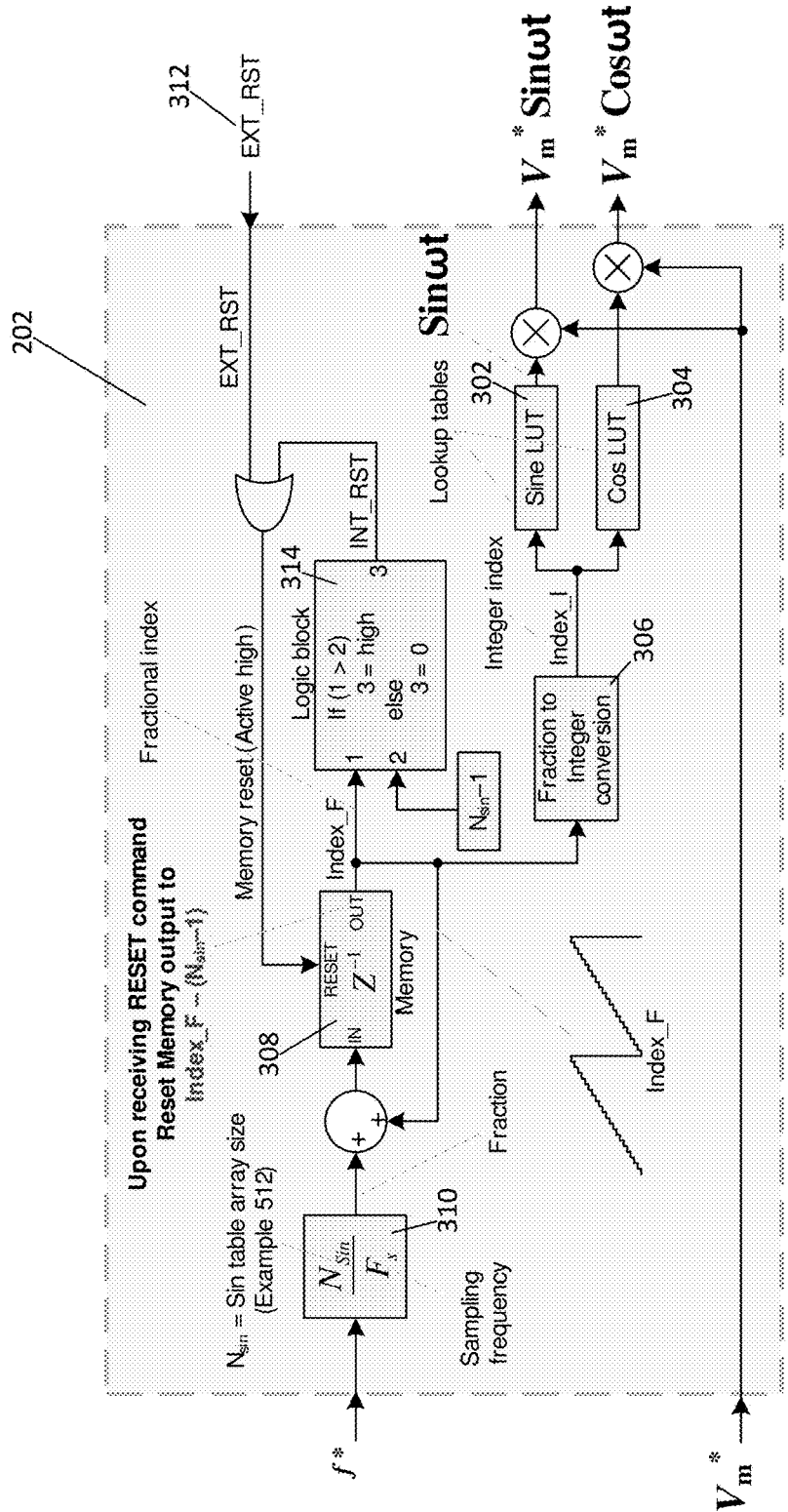
FIG. 3 is a block diagram of an inverter voltage reference generation module according to aspects described herein.

FIG. 3 illustrates a more detailed block diagram of the inverter voltage reference generation module 202. The inverter voltage reference generation module 202 receives two DC input references, the base frequency reference f* and the base peak voltage reference $V_m*$ of the inverter output voltage. The inverter voltage reference generation module 202 operates on f* and $V_m*$ to generate two sinewave signals; $V_m*\mathrm{Sin}\,\omega t$ and $V_m*\mathrm{Cos}\,\omega t$. The $V_m*\mathrm{Sin}\,\omega t$ signal is configured to set an inverter output voltage reference of the controller 200, while the $V_m*\mathrm{Cos}\,\omega t$ signal is utilized by the controller 200 to compute the average reactive power output of the inverter 103 (e.g., for estimating frequency droop).

According to at least one embodiment, the Sin ωt and Cos ωt portions of the signals described above are calculated using corresponding lookup tables (LUT) 302, 304 and an inverter voltage reference index (Index_I) generated by a fraction to integer conversion module 306. The fraction to integer conversion module 306 generates the reference index (Index_I) based on a fraction index (Index_F) received from a memory module 308. The memory module 308 updates the fraction index (Index_F) based on the current fraction index value and the output of a fraction calculation module 310. The output of the fraction calculation module 310 is calculated based on a Sin table array size ($N_{Sin}$) and an ADC sampling frequency ($F_S$). The fraction calculation module 310 defines the Sin table array size ($N_{Sin}$) and/or the sampling frequency ($F_S$) based on the base frequency reference f*. The amplitudes of the $V_m*\mathrm{Sin}\,\omega t$ and $V_m*\mathrm{Cos}\,\omega t$ signals are defined by the base peak voltage reference $V_m*$.

According to at least one embodiment, the output of the memory module 308 can be reset externally through a reset signal 312 (EXT_RST). In combination with a logic module 314, the reset signal 312 (EXT_RST) can be utilized to synchronize the phase of the inverter output voltage of a newly connected UPS with the load bus 115 voltage.

Figure 4:
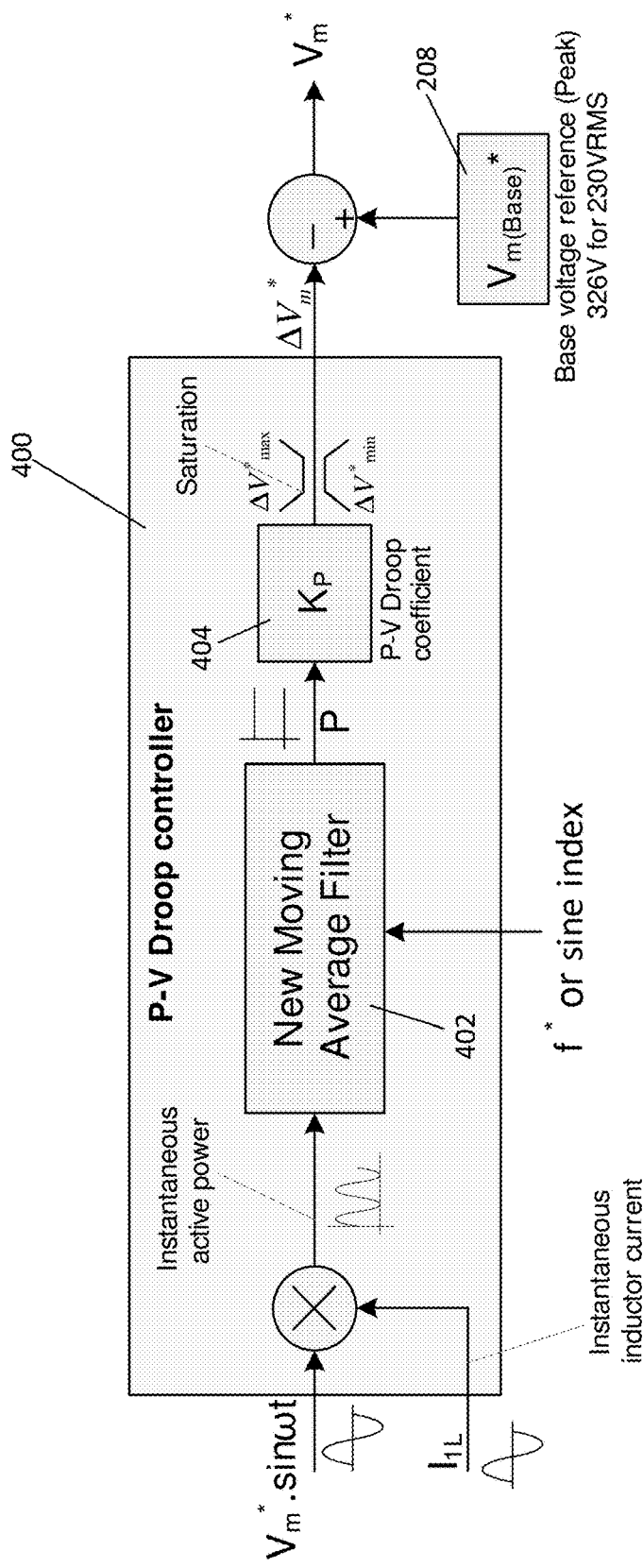
FIG. 4 is a block diagram of an active power droop controller according to aspects described herein.
Figure 5:
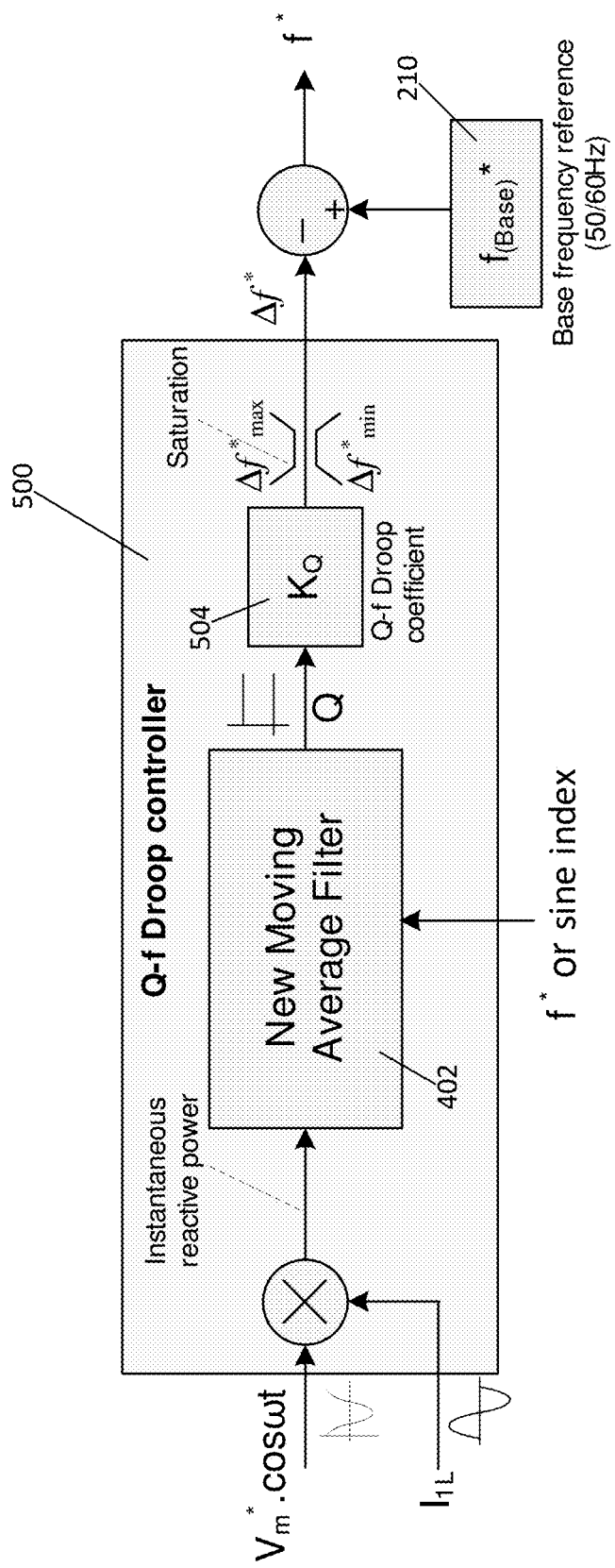
FIG. 5 is a block diagram of a reactive power droop controller according to aspects described herein.

FIG. 4 is a block diagram illustrating a P-V (i.e., active power) droop controller 400 and FIG. 5 is a block diagram illustrating a Q-f (i.e., reactive power) droop controller 500. The active and reactive power droop controllers 400, 500 emulate resistive output impedance characteristics at each inverter output. More specifically, the active power droop controller 400 introduces a droop in the output voltage amplitude, while the reactive power droop controller 500 introduces a droop in the output inverter frequency.

In the active power droop controller 400 (shown in FIG. 4), the instantaneous active power of the inverter 103 is computed by multiplying the output voltage reference ($V_m$*Sin ωt) with the instantaneous inductor output current ($I_{IL}$) from the output 111 of the inverter 108. A Moving Average Filter (MAF) module 402 filters out the second-harmonic component from the instantaneous active power and outputs the DC component of the instantaneous active power (P). The output voltage droop $\Delta V_m^*$ is obtained by multiplying the DC component of the instantaneous active power (P) with the P-V droop coefficient $K_P$ 404 and it is clamped between its maximum and minimum values ($\Delta V^*_{max}$, $\Delta V^*_{min}$). The final amplitude reference $V_m^*$ is obtained by subtracting the output voltage droop $\Delta V_m^*$ from the base voltage reference $V_{m(Base)}^*$ 208. According to one embodiment, the P-V droop coefficient $K_P$ is given by the below equation:

$$K_P = \frac{\text{Desired voltage droop(V)}}{\text{Rated active power output(W)}}.$$

In the reactive power droop controller 500 (shown in FIG. 5, the instantaneous reactive power of the inverter 103 is computed by multiplying the $V_m$*Cos ωt signal with the instantaneous inductor output current ($I_{IL}$). The Moving Average Filter (MAF) module 402 filters out the second-harmonic component from the instantaneous reactive power and outputs the average instantaneous reactive power (Q). The output frequency droop $\Delta f^*$ is obtained by multiplying the average instantaneous reactive power (Q) with the Q-f droop coefficient $K_Q$ 504 and it is clamped between its maximum and minimum values. The final frequency reference f* is obtained by subtracting the output frequency droop $\Delta f^*$ from the base frequency reference 210. According to one embodiment, the Q-f droop coefficient $K_Q$ is given by the below equation:

$$K_Q = \frac{\text{Desired frequency droop(Hz)}}{\text{Rated reactive power output(W)}}.$$

As discussed above with respect to FIGS. 4 and 5, each droop controller 400, 500 implements a moving average filter module 402. The MAF module 402 improves the settling/convergence time of each controller and is realized by passing the output of a moving average filter through a Min-Max filter, as discussed in greater detail below.

Figure 6:
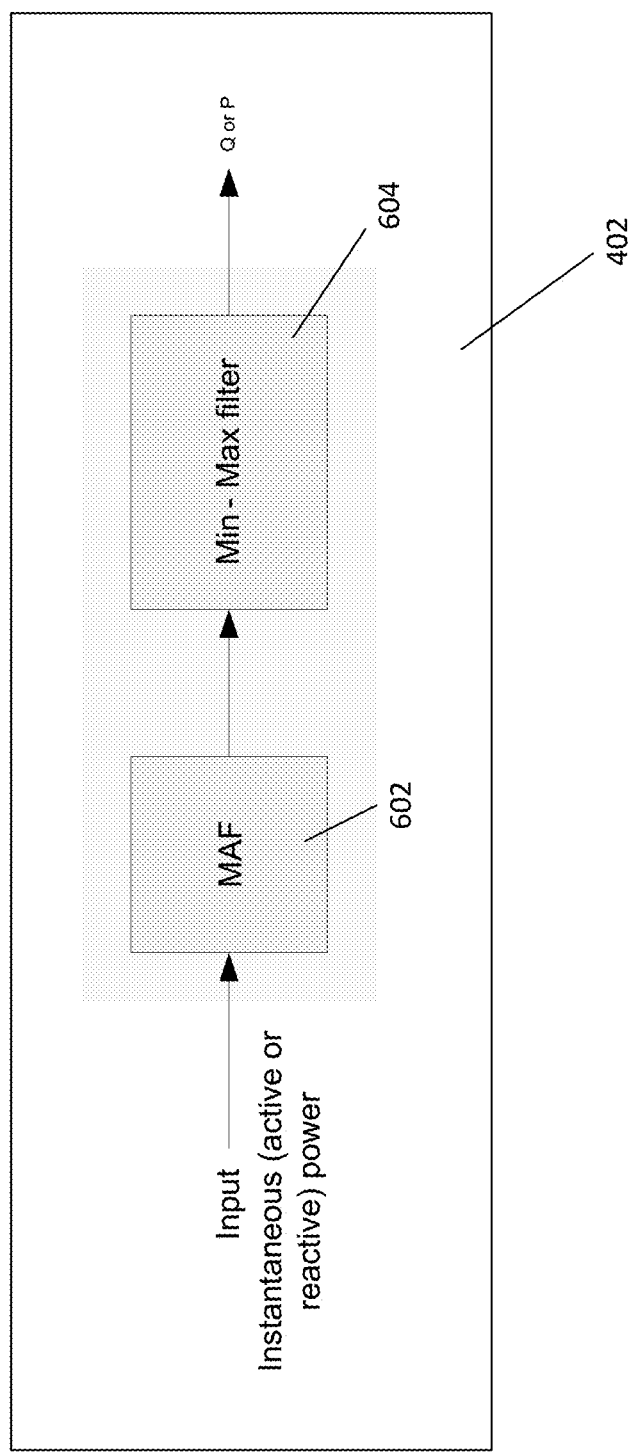
FIG. 6 is a block diagram of a moving average filter module according to aspects described herein.

FIG. 6 is a block diagram of the MAF module 402 including a moving average filter 602 and a Min-Max filter 604. The moving average filter 602 receives a pulsating input signal (e.g., the instantaneous active power signal or the instantaneous reactive power signal depending on whether the MAF module 402 is in the active power droop controller 400 or the reactive power droop controller 500) and the frequency reference f* and returns a one cycle average of the input signal.

The moving average filter 602 utilizes the frequency reference f* to set the width of a moving window of the filter 602. According to one embodiment, the moving average filter 602 utilizes the inverter voltage reference index (Index_I) (discussed above with respect to FIG. 3) to set the frequency reference f*. The equation below represents the number of available samples ($N_S$) in one fundamental cycle of frequency f*, where $F_S$ is the ADC sampling frequency:

$$N_S = \frac{F_s}{f^*}.$$

Figure 7:
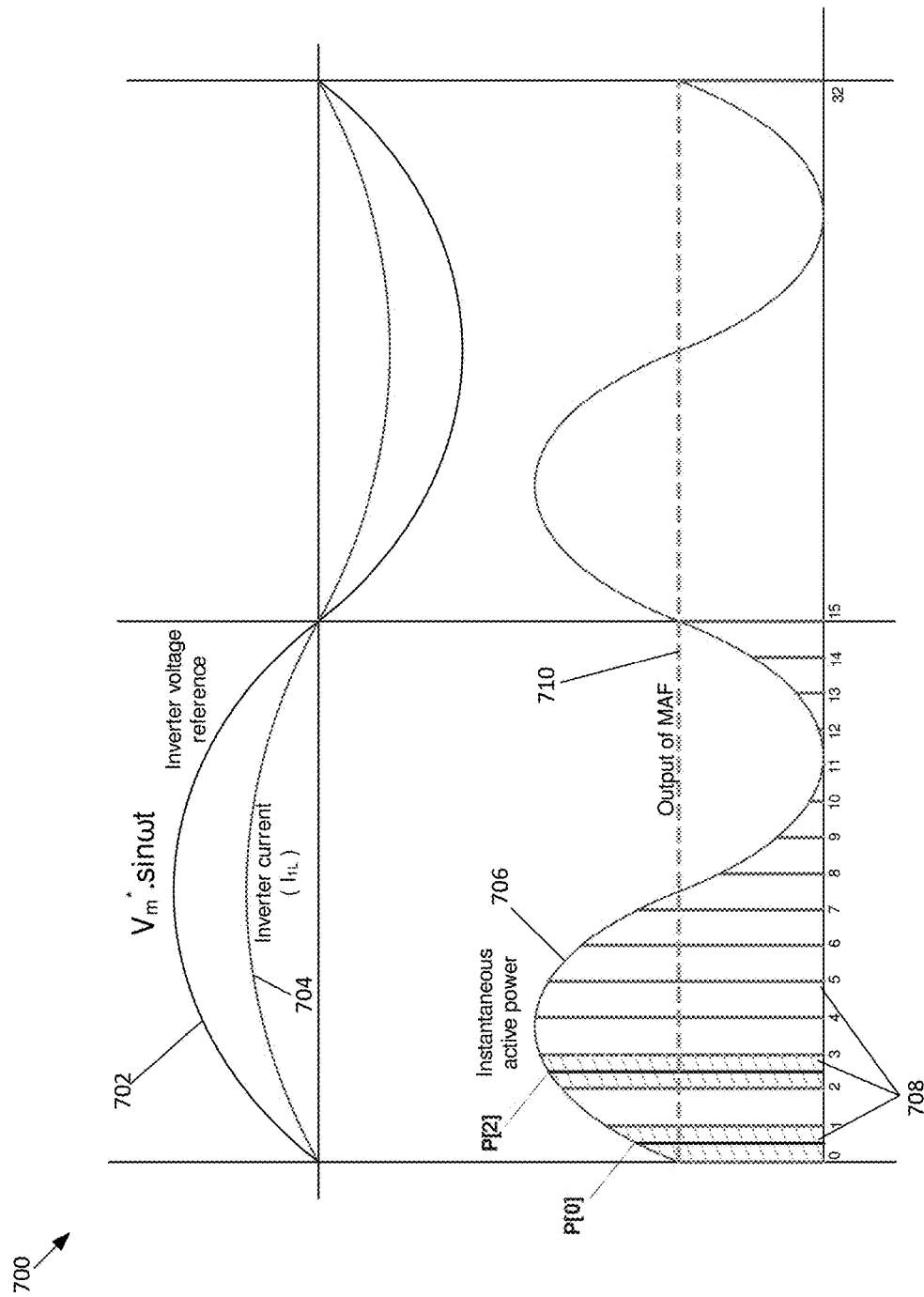
FIG. 7 is a graph illustrating operation of a moving average filter according to aspects described herein.

FIG. 7 is a graph 700 illustrating operation of the moving average filter 602 in the active power droop controller 400. The graph 700 includes a first trace 702 representing the inverter voltage reference ($V_m$*Sin ωt), a second trace 704 representing the instantaneous inductor output current ($I_{IL}$), and a third trace 706 representing the instantaneous active power (P). As further illustrated by FIG. 7, the number of available samples ($N_S$), described above, are equally divided into 32 groups 708. All samples within a group 708 are average and stored in the $n^{th}$ location as P[n], where n=0 . . . 31. In this way all $N_S$ number of samples in a fundamental cycle of frequency f* are converted into 32 samples and stored in a buffer of 32 memory locations. The algorithm of the moving average filter is represented by the following equation:

$$P_{Active(New)} = P_{Active(Old)} + \frac{P[n]_{New} - P[n]_{Old}}{32}$$

$$P[n]_{Old} = P[n]_{New}$$

$$P_{Active(Old)} = P_{Active(New)}.$$

The moving average filter equation shown above is run 32 times, e.g., with equal intervals, over a complete fundamental cycle. The output of the moving average filter 602 ($P_{Active(New)}$) returns the DC component of the input samples P[n]. As described above, the moving average filter 602 is implemented as a 32 point MAF; however, in other embodiments, the moving average filter 602 can be implemented for any number of points and/or any number of samples. As shown in FIG. 7 (and described above), operation of the moving average filter 602 in the active power droop controller 400 is illustrated. The moving average filter 602 also operates in substantially the same way in the reactive power droop controller 500, except that that the output is the DC component of the input samples Q[n].

Figure 8:
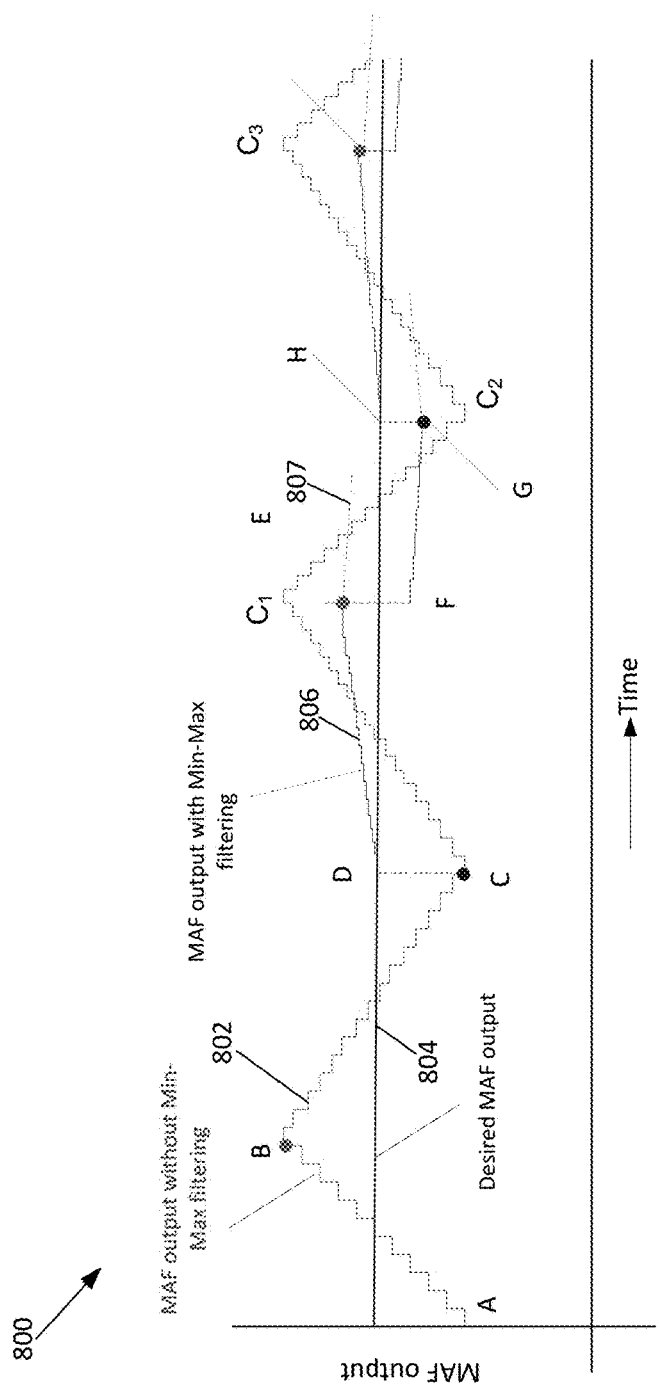
FIG. 8 is a graph illustrating the output of a moving average filter according to aspects described herein.

Operation of the moving average filter module 402 is discussed in greater detail below with respect to FIG. 8. FIG. 8 is a graph 800 illustrating the output of the moving average filter 602 over time in the reactive power droop controller 500. The graph 800 includes a first trace 802 illustrating the reactive output ($Q_{reactive(New)}$) of the moving average filter 602, a second trace 804 representing a desired output of the moving average filter 602, and a third trace 806 representing the output of the Min-Max filter 604.

The delay introduced by the moving average filter 602 in processing $Q_{reactive(New)}$ can result in oscillatory system response and a large settling/convergence time (e.g., as shown by the first trace 802). The trajectory of the output 802 of the moving average filter 602 shown in FIG. 8 is A→B→C→C1→C2→C3, where the output 802 attains maximum values at B, C1, and C3 and minimum values at A, C, and C2. The settling/convergence time can be improved by passing the output ($Q_{reactive(New)}$) of the moving average filter 602 through the Min-Max filter 604. The algorithm implemented by the Min-Max filter 604 operates on the output 802 to improve the settling/convergence time.

For example, according to at least one embodiment, the Min-Max filter algorithm starts from point A and makes the final output (Q) of the Min-Max filter 604 equal $Q_{reactive(New)}$ and follow the output of the moving average filter 602 (i.e., the first trace 802) until point C. This is represented by the following equation:

$$P_{Reative(New)} = Q_{Reactive(Old)} + \frac{Q[n]_{New} - Q[n]_{Old}}{32} \qquad (1)$$

$$Q[n]_{Old} = Q[n]_{New}$$

$$Q_{Reactive(Old)} = Q_{Reactive(New)}.$$

The Min-Max filter 604 also continuously monitors the trajectory of the output (Q) of the Min-Max filter 604 and looks for when the output (Q) changes direction. For example, at point B, the output (Q) changes direction. At this time, the Min-Max filter 604 stores the maximum value of Q as $Q_{MAX}=Q_B$. Again at point C, the output (Q) changes direction. At this time, the Min-Max filter 604 stores the minimum value of Q as $Q_{MIN}=Q_C$.

After point C, the output (Q) of the Min-Max filter 604 is forced to follow the following equation:

$$Q = Q_{Reactive(New)} = \frac{Q_{Max} + Q_{Min}}{2}. \qquad (2)$$

Accordingly, the output (Q) of the filter 604 jumps from point C to point D. After point D, the Min-Max filter algorithm again operates per equation (1) shown above and the output (Q) moves along the second trace 806 from point D to point E.

At point E, the output (Q) again tends to change direction (e.g., as shown by the dotted line 807) and $Q_{MAX}$ is updated as $Q_E$. The output (Q) is then forced to have the value calculated by equation (2) with $Q_{MAX}=Q_E$ and $Q_{MIN}=Q_C$. As a result, the value of Q will change from $Q_E$ to $Q_F$, where $Q_F$ is the value of Q at point F.

After point F, the Min-Max filter 604 continues to execute equation (1) until point G arrives, where Q again tends to change its direction. The Min-Max filter 604 continues to implement the steps described above. In this way, the output (Q) of the Min-Max filter 604 moves along A→B→C→D→E→F→G→H→I→ . . . (i.e., the second trace 806), while the output of the moving average filter 602 moves along the first trace 802. As shown in FIG. 8, the output of the Min-Max filter 604 converges faster than the output of the moving average filter 602.

A sample code for the Min-Max filter 604 is given below, where Q=$Q_{Reactive(New)}$ is the output of the Min-Max filter 604:

Q_old = Q_new;
Q_new = $Q_{Reactive(New)}$;

-continued

```
Q_flag_old = Q_flag_new;
if(Q_new > Q_old)
    {
    Q_flag_new = TRUE;
    }
else if(Q_new < Q_old)
    {
    Q_flag_new = FALSE;
    }
if(Q_flag_new != Q_flag_old)
    {
    Q_limit_value[n] = $Q_{Reactive(New)}$;
    $Q_{Reactive(New)}$ = (Q_limit_value[0] + Q_limit_value[1]) >> 1;
    n += 1;
    if (n > 1)
        {
        n = 0;
        }
    }
```

As shown in FIG. 8 (and described above), operation of the moving average filter module 402 (including the moving average filter 602 and the Min-Max filter 604) in the reactive power droop controller 500 is illustrated. The moving average filter module 402 also operates in substantially the same way in the active power droop controller 400, except that that the output is P=$P_{Active(New)}$.

Typical control loops of traditional inverters are commonly designed to achieve low output impedance to improve output voltage regulation and achieve low output voltage harmonic distortion. However, this may result in poor harmonic current sharing among paralleled inverters. The droop controller 200 operates to provide fundamental active and reactive current/power sharing. However, it may not provide equal sharing for harmonic current (i.e., non-linear loads). As such, according to at least one embodiment, the droop controller 200 is configured to introduce an additional virtual output resistance 212 to the inverter voltage reference ($V_m$*Sin ωt).

Figure 9:
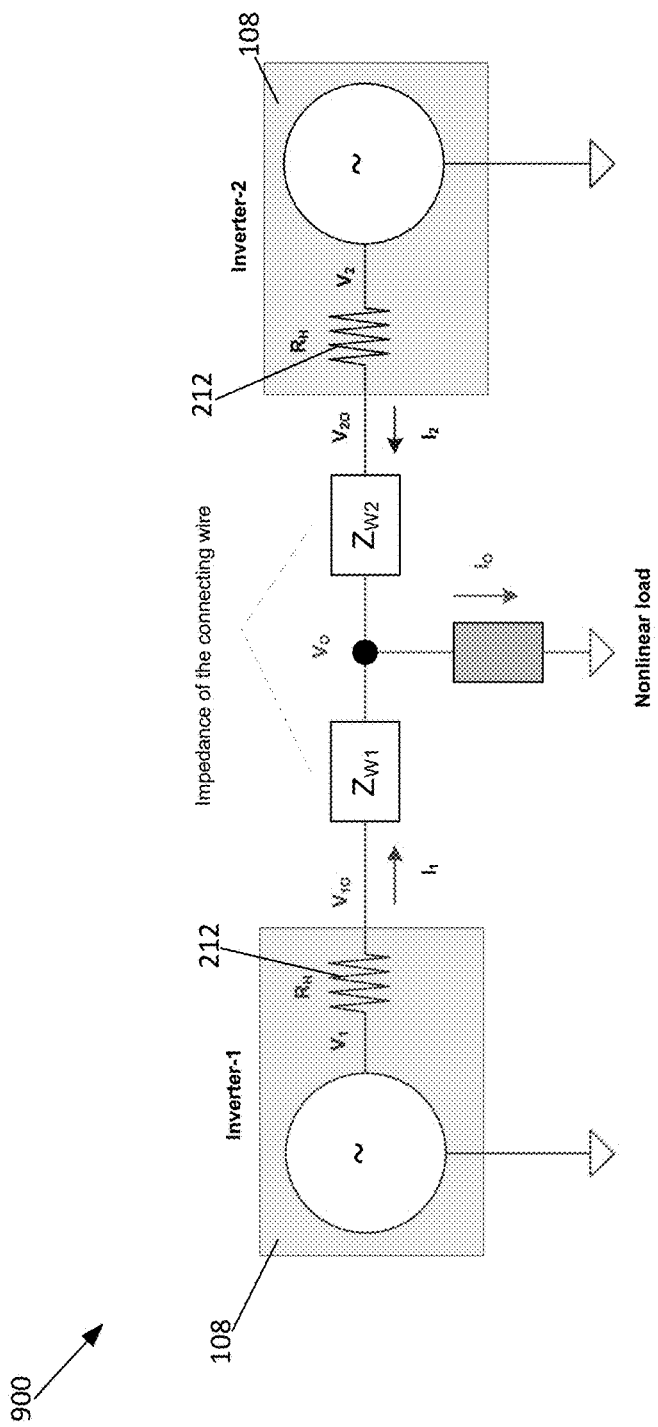
FIG. 9 is a block diagram of an example parallel inverter system according to aspects described herein.
Figure 10:
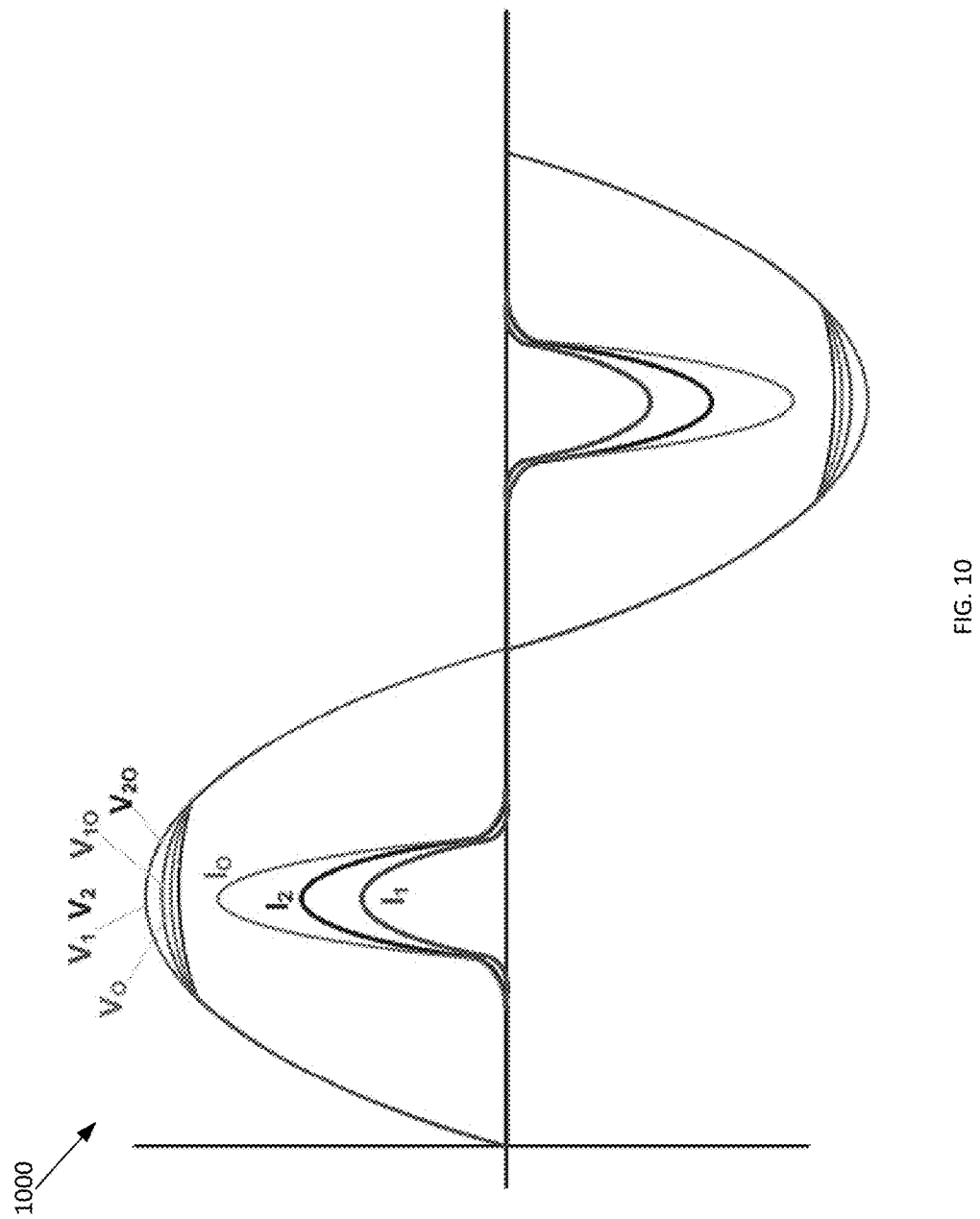
FIG. 10 is a graph illustrating the impact of a virtual output resistance on different characteristics of an inverter according to aspects described herein.

The additional virtual output resistance 212 is implemented with a control loop that introduces virtual output resistance $R_H$ in series with the inverter output as shown in FIG. 9. FIG. 9 is a block diagram illustrating an example parallel inverter system 900 including two inverters (e.g., inverter 108 as shown in FIG. 1) coupled in parallel to a nonlinear load. Each inverter has a virtual output resistance 212 implemented at its output. The impact of the virtual output resistance 212 on different characteristics of each inverter 108 is illustrated in FIG. 10. More specifically, FIG. 10 is a graph 1000 illustrating the impact of the virtual output resistance 212 on $V_0$, $V_1$, $V_2$, $V_{10}$, $V_{20}$, $I_0$, $I_1$, and $I_2$ of the inverter 108. The implementation of the virtual output resistance 212 is discussed in greater detail below with respect to FIG. 11.

Figure 11:
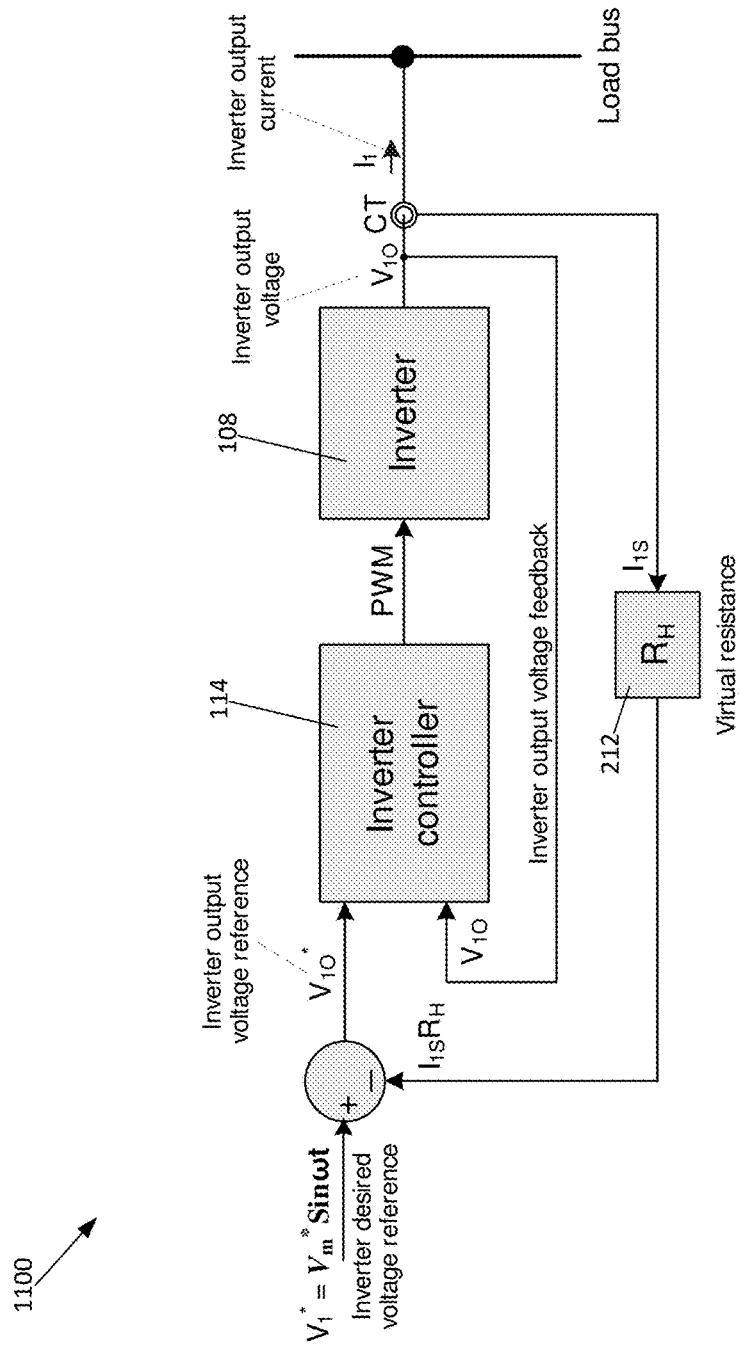
FIG. 11 is a block diagram of a control loop that implements a virtual output resistance according to aspects described herein.

FIG. 11 is a block diagram of a control loop 1100 that implements a virtual output resistance $R_H$ 212 in series with an output of an inverter (e.g., the inverter 108 shown in FIG. 1). As shown in FIG. 11, the virtual output resistance $R_H$ 212 is introduced in the droop controller 200 by subtracting the computed instantaneous voltage drop ($I_{IS}R_H$) from the inverter voltage reference ($V_m$*Sin ωt), where $I_{IS}$ is the measured instantaneous inverter output current.

Figure 12:
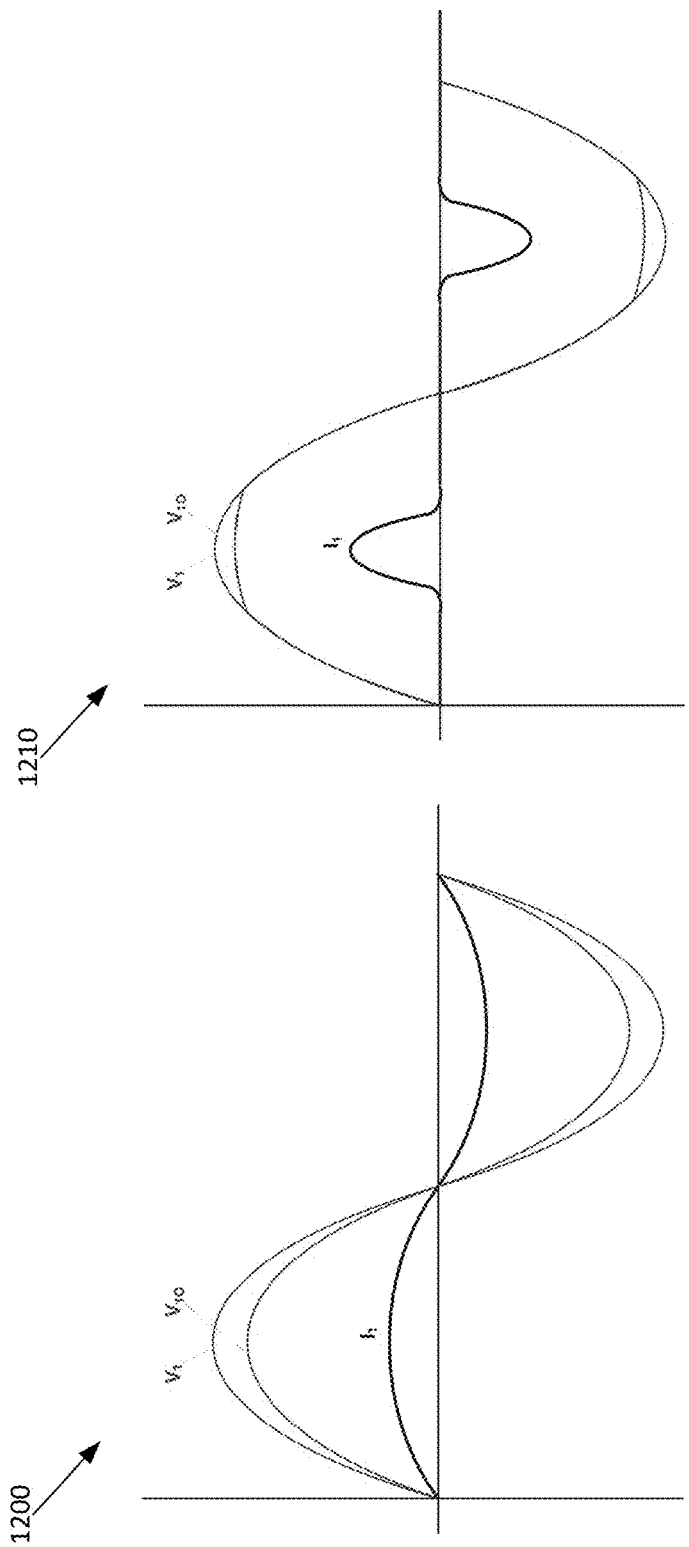
FIG. 12A is a graph illustrating the RMS output of an inverter coupled to a linear load according to aspects described herein.
FIG. 12B is a graph illustrating the RMS output of an inverter coupled to a nonlinear load according to aspects described herein.

The output impedance of the inverter 108 can cause output voltage drop (or distortion in a case of a nonlinear current) under load. As such, if the droop controller 200 is designed to achieve high output impedance or implement a virtual output impedance, the result can be a relatively high output voltage drop or distortion. In the case of a linear load, the RMS output voltage decreases from its desired value of $V_1$ to $V_{10}$ (e.g., as shown in FIG. 12A). In the case of a nonlinear load, the output voltage waveform becomes distorted (e.g., as shown in FIG. 12B).

Although the RMS voltage reduction (e.g., as shown in FIG. 12A) can be corrected by increasing the amplitude of the inverter voltage reference ($V_m^*\text{Sin }\omega t$), the output voltage waveform distortion, for example as shown in FIG. 12B, may not be easily controlled. As such, according to at least one embodiment, the droop controller 200 is configured to compensate for the distortion due to a nonlinear load with the drop compensation controller 216.

Figure 13:
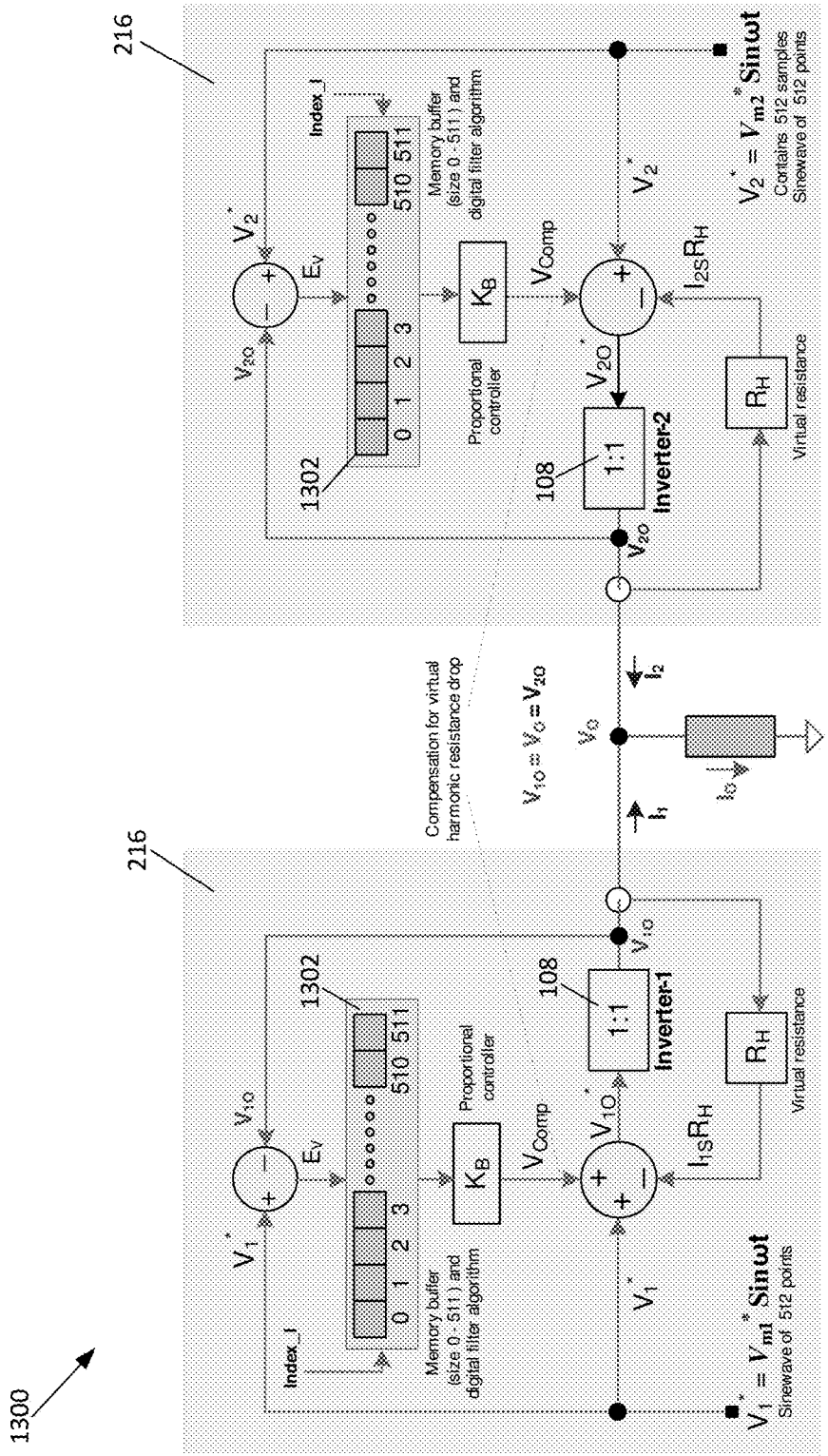
FIG. 13 is a control block diagram of two parallel inverters according to aspects described herein.
Figure 14:
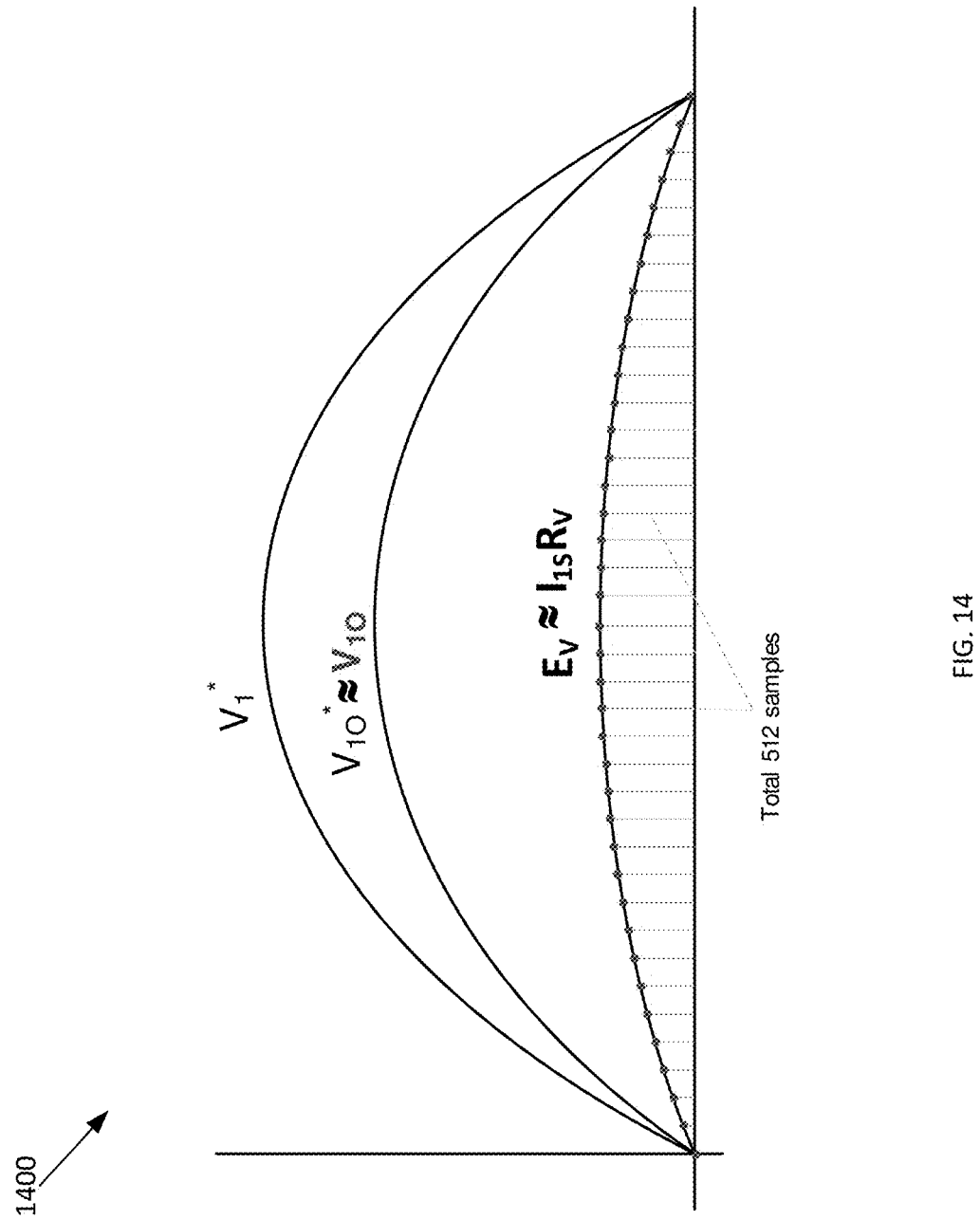
FIG. 14 is a graph illustrating sampled inverter output voltage error according to aspects described herein.

For example, FIG. 13 is one embodiment of a control block diagram 1300 of two parallel inverters (e.g., inverter 108 as shown in FIG. 1) including the drop compensation controller 216. By storing the instantaneous sampled output voltage error $E_V=(V_1^*-V_{10})$ in a buffer 1302 (e.g., with a buffer size of 512) over a complete fundamental cycle, for example as shown in the graph 1400 of FIG. 14, and adding the stored error voltage to the inverter voltage reference ($V_m^*\text{Sin }\omega t$) in the subsequent fundamental cycle, the effect of the voltage error due to virtual harmonic resistance drop can be compensated for by the drop compensation controller 216. Further filtering may also be utilized to filter out noise that might be present in the voltage error without introducing much phase error.

As one example, the $10^{th}$ sample of new data ($B_N[10]$) which is to be stored in the buffer 1302 is given by the following equation where B[6] to B[14] correspond to the old values stored in the buffer and $E_V[10]$ is the current ($10^{th}$ sample) voltage error:

$$B_N[10] = \frac{B[6]+B[7]+B[8]+B[9]+B[10]+E_V[10]+B[11]+B[12]+B[13]+B[14]}{10}.$$

The $10^{th}$ sample compensation voltage $V_{Comp}$ is given by the following equation, where $K_B$ is a proportional gain:

```
If (E_V[10] <= 10V)
{
V_Comp[10] = K_B . B_N[10]
}
else
{
V_Comp[10] = (0.9B[10]) + K_B . (0.1 B_N[10])
}
```

The gain $K_B$ decides the level of compensation. For example, $K_B=1$ corresponds to full compensation and $K_B<1$ corresponds to partial compensation, which may be sufficient to keep the output voltage THD less than its acceptable limit (e.g., 5%).

The effective output resistance of an inverter (e.g., an inverter 108 as shown in FIG. 1) to DC current is relatively small. Further, each inverter can have a small DC voltage offset in its output voltage due to tolerances in control sensors and parameters. This may cause relatively large DC circulating current between inverters. The adverse effects of this can be DC bus overvoltage at no/light load, current imbalance in the individual half cycles, and unequal current sharing. As such, according to at least one embodiment, the droop controller 200 is configured to address these issues with the circulating current prevention controller 218.

Figure 15:
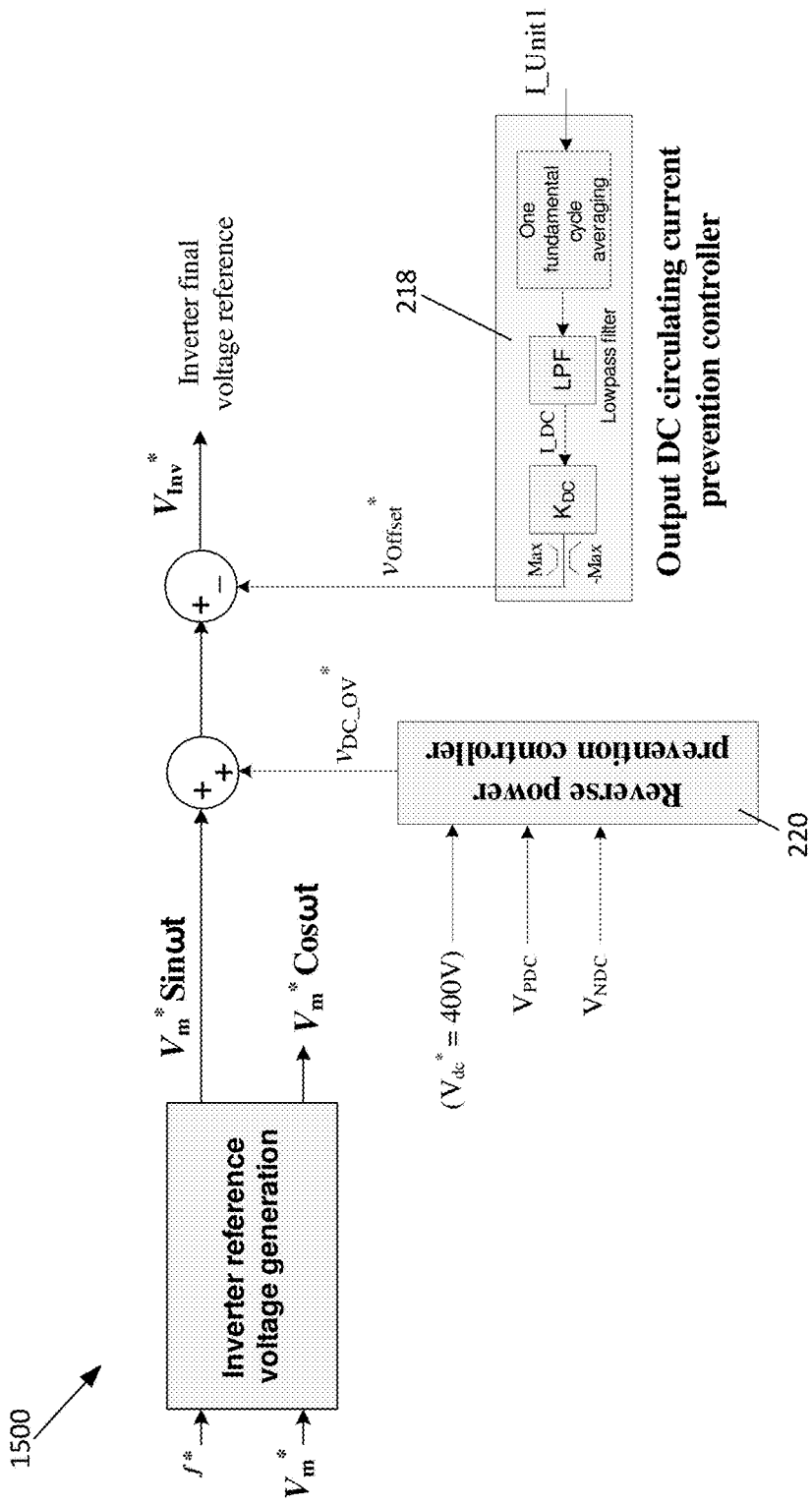
FIG. 15 is a block diagram of a circulating current prevention controller according to aspects described herein.

For example, FIG. 15 is a more detailed block diagram 1500 including the circulating current prevention controller 218. As shown in FIG. 15, the circulating current prevention controller 218 introduces a DC droop $V_{offset}^*$ to the inverter final voltage reference $V_{Inv}^*$ to have control over the DC circulating current. More specifically, the circulating current prevention controller 218 averages the instantaneous output current I_Unitx (where x=1, 2, 3 . . . ) over a fundamental cycle to extract its DC component I_DC. A Lowpass Filter (LPF) smoothens any noise present in the DC component before it is multiplied by a gain $K_{DC}$ to obtain the final controller output $V_{Offset}^*$. The gain $K_{DC}$ can be selected in way to minimize the DC circulating current.

Due to the resistive output virtual impedance of an inverter (e.g., inverter 108 shown in FIG. 1), small voltage amplitude differences can lead to active power being circulated among inverters. At no load or light load, this can cause DC bus overvoltage (e.g., on DC bus 106 shown in FIG. 1) due to active power being provide directly to the DC bus 106 and the inability of the front end PFC converter 103 and/or DC-DC converter 107 to absorb the circulating power. As such, according to at least one embodiment, the droop controller 200 is configured to address these issues with the reverse power prevention controller 220 shown in FIG. 15.

Figure 16:
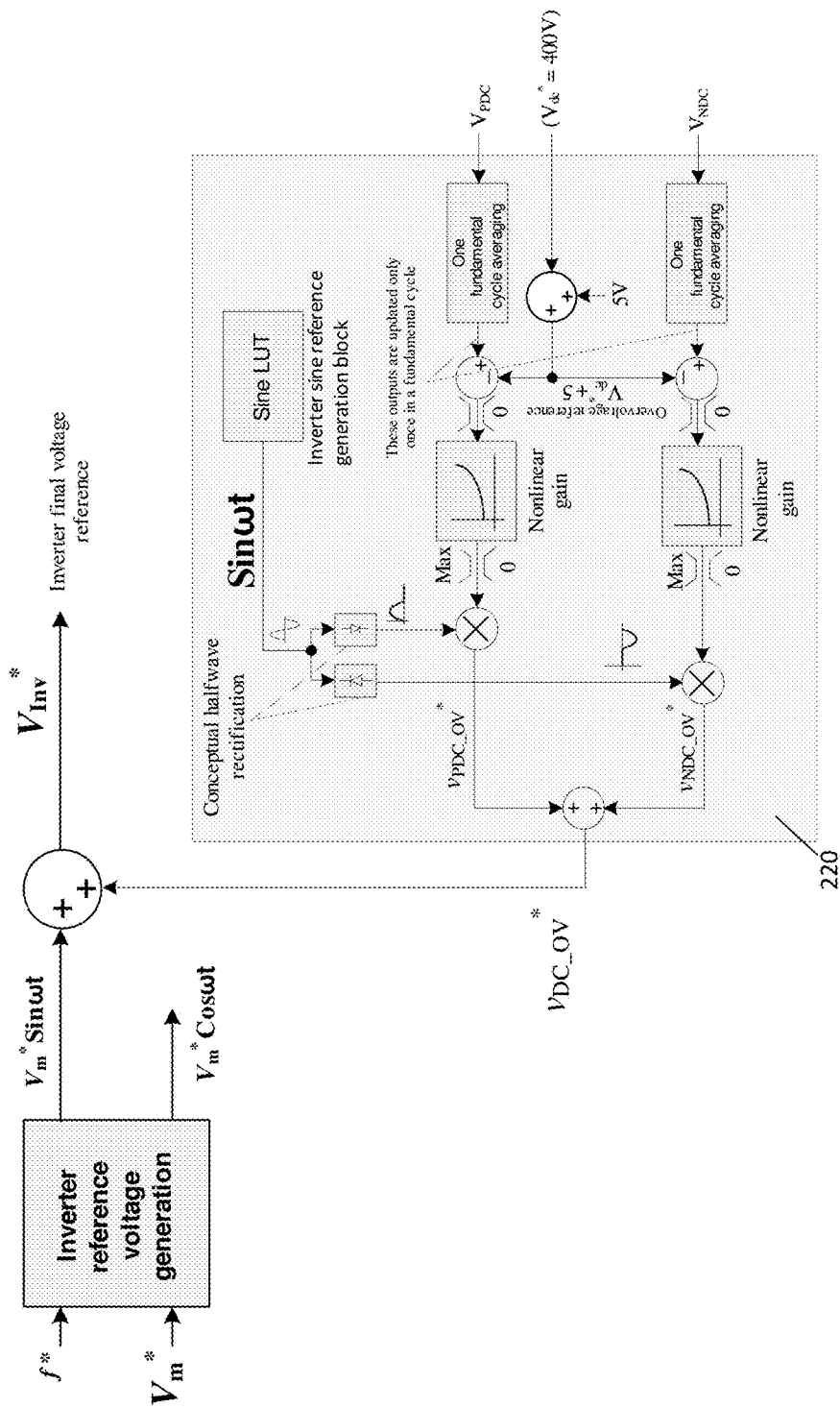
FIG. 16 is a block diagram of a reverse power prevention controller according to aspects described herein.

For example, FIG. 16 is a more detailed block diagram 1600 of the reverse power prevention controller 220. The reverse power prevention controller 220 outputs a signal $V_{DC\_OV}$ to prevent the DC link overvoltage problem. The $V_{DC\_OV}$ signal is added to the inverter voltage reference ($V_m^*\text{Sin }\omega t$) to generate the inverter final voltage reference $V_{Inv}^*$. More specifically, the reverse power prevention controller 220 generates the signal $V_{DC\_OV}$ by averaging the two instantaneous DC bus voltages (i.e., $V_{PDC}$ and $V_{NDC}$ from the DC bus 106 as shown in FIG. 1) over a complete line cycle to filter out low-frequency ripple. According to one embodiment, an overvoltage condition on a particular DC bus is defined to be 5V higher than a reference DC bus voltage; however, in other embodiments an overvoltage can be defined differently. If a particular DC bus experiences an overvoltage, the reverse power prevention controller 220 adds a half sinewave voltage (i.e., positive sinewave voltage for $V_{PDC}$ and negative sinewave voltage for $N_{PDC}$) to the inverter voltage reference ($V_m^*\text{Sin }\omega t$).

Figure 17:
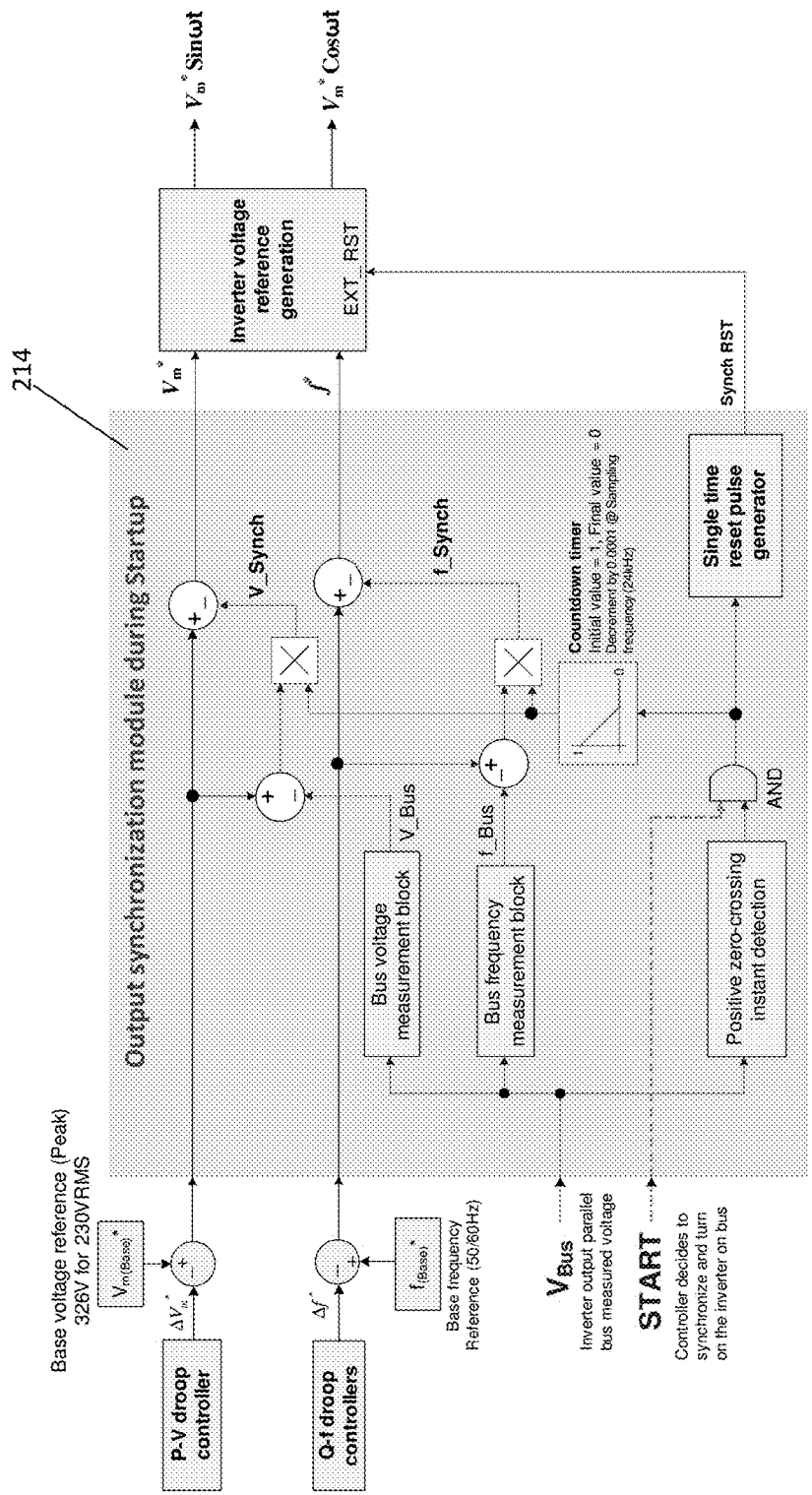
FIG. 17 is a block diagram of an output synchronization module according to aspects described herein.
Figures 18A, 18B:
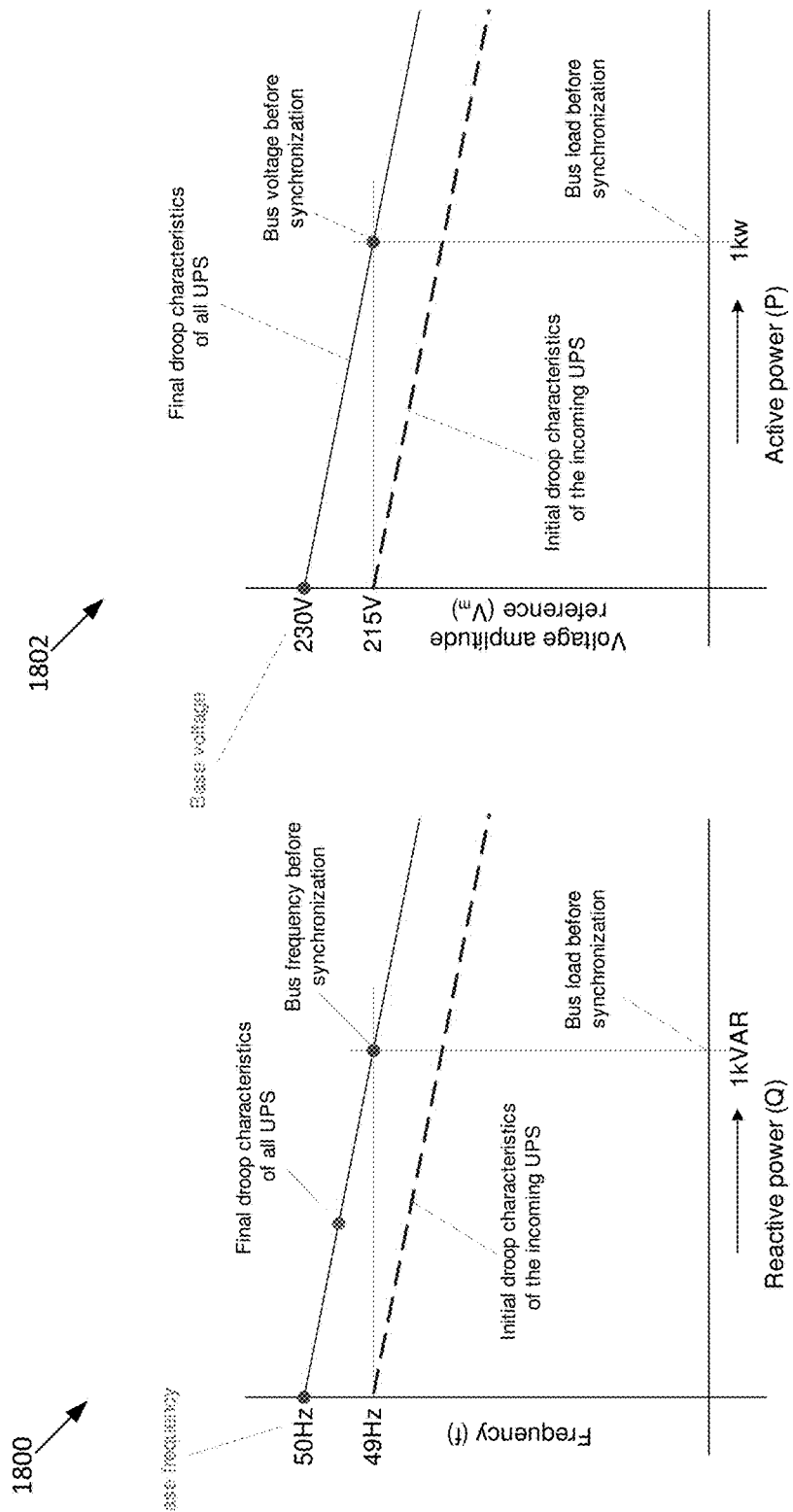
FIG. 18A is a graph illustrating initial and final reactive power droop characteristics of an inverter according to aspects described herein.
FIG. 18B is a graph illustrating initial and final active power droop characteristics of an inverter according to aspects described herein.

FIG. 17 is a more detailed block diagram of the output synchronization module 214. The output synchronization module 214 is configured to safely turn on an inverter (e.g., the inverter 108 shown in FIG. 1) which was initially in a standby/off mode, and synchronize the inverter 108 to a load bus (e.g., the bus 115 shown in FIG. 1) which may be fed by multiple parallel units and which may have minimum output current dynamics. The output synchronization module 214 operates to turn on an inverter 108 by first measuring the voltage, frequency, and phase of the load bus and turning on the inverter 108 with the same output voltage, frequency, and phase as the load bus 115. The newly turned on inverter 108 will float on the bus with negligible startup dynamics and will not share any load. The output synchronization module 214 then slowly increases the voltage and frequency references of the newly turned on inverter 108 to the actual voltage and frequency references of all the other UPSs coupled in parallel over a number of fundamental cycles (e.g., 20). In this way, the newly turned on inverter 108 will gradually share the load 116. FIGS. 18A and 18B are graphs 1800, 1802 illustrating the initial and final droop characteristics for active and reactive power of the newly turned on inverter 108.

Figure 19:
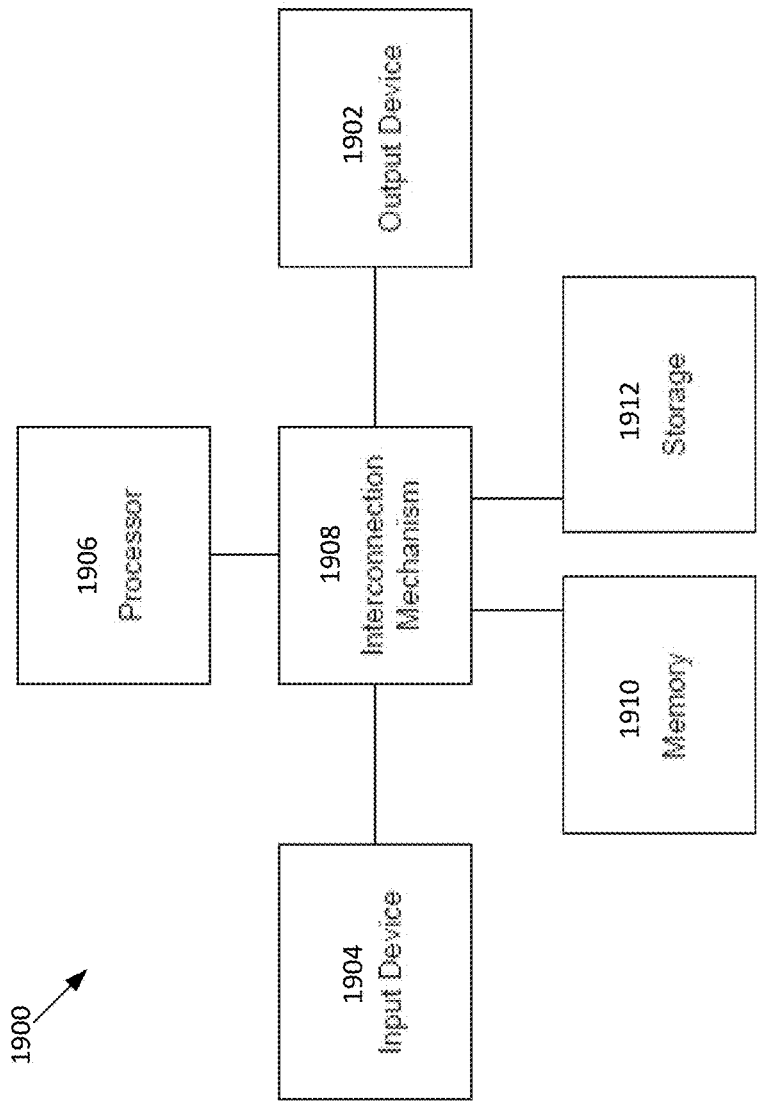
FIG. 19 is a block diagram of a system upon which various embodiments of the invention may be implemented.

FIG. 19 illustrates an example block diagram of computing components forming a system 1900 which may be configured to implement one or more aspects disclosed herein. For example, the system 1900 may be communicatively coupled to the droop controller 200 or included within the droop controller 200. The system 1900 may also be configured to operate an inverter and/or inverter controller as discussed above.

The system 1900 may include for example a computing platform such as those based on Intel PENTIUM-type processor, Motorola PowerPC, Sun UltraSPARC, Texas Instruments-DSP, Hewlett-Packard PA-RISC processors, or any other type of processor. System 1900 may include specially-programmed, special-purpose hardware, for example, an application-specific integrated circuit (ASIC). Various aspects of the present disclosure may be implemented as specialized software executing on the system 1900 such as that shown in FIG. 19.

The system 1900 may include a processor/ASIC 1906 connected to one or more memory devices 1910, such as a disk drive, memory, flash memory or other device for storing data. Memory 1910 may be used for storing programs and data during operation of the system 1900. Components of the computer system 1900 may be coupled by an interconnection mechanism 1908, which may include one or more buses (e.g., between components that are integrated within a same machine) and/or a network (e.g., between components that reside on separate machines). The interconnection mechanism 1908 enables communications (e.g., data, instructions) to be exchanged between components of the system 1900. The system 1900 also includes one or more input devices 1904, which may include for example, a keyboard or a touch screen. The system 1900 includes one or more output devices 1902, which may include for example a display. In addition, the computer system 1900 may contain one or more interfaces (not shown) that may connect the computer system 1900 to a communication network, in addition or as an alternative to the interconnection mechanism 1908.

The system 1900 may include a storage system 1912, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 1910 that allows for faster access to the information by the processor/ASIC than does the medium. This memory 1910 may be a volatile, random access memory such as a dynamic random access memory (DRAM) or static memory (SRAM). It may be located in storage system 1912 or in memory system 1910. The processor 1906 may manipulate the data within the integrated circuit memory 1910 and then copy the data to the storage 1912 after processing is completed. A variety of mechanisms are known for managing data movement between storage 1912 and the integrated circuit memory element 1910, and the disclosure is not limited thereto. The disclosure is not limited to a particular memory system 1910 or a storage system 1912.

The system 1900 may include a computer platform that is programmable using a high-level computer programming language. The system 1900 may be also implemented using specially programmed, special purpose hardware, e.g. an ASIC. The system 1900 may include a processor 1906, which may be a commercially available processor such as the well-known Pentium class processor available from the Intel Corporation. Many other processors are available. The processor 1906 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

As described herein, in at least some embodiments, a new droop control system and method for paralleling multiple inverters with no inverter control interconnections is provided. The droop control system and method described herein includes a complete droop system architecture to deal with traditional droop control drawbacks described above. More specifically, the droop control system and method described herein can offer faster dynamic load sharing response, improved output voltage regulation and low voltage Total Harmonic Distortion (THD), DC bus overvoltage control at light/no load, DC circulating current control, and/or improved synchronization to load bus control. The droop control system and method described herein can handle both high and low output impedances and is suitable for both analog and digital implementation The droop control system described herein includes multiple different modules to deal with different issues related to droop control. In different embodiments, the droop control system may include any number of the different modules described herein.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An Uninterruptible Power Supply (UPS) system comprising:
   an input configured to be coupled to an AC source and to receive input AC power from the AC source;
   an output configured to provide output AC power to a load;
   a converter coupled to the input and configured to convert the input power into DC power;
   an inverter having an inverter output coupled to the output of the UPS, the inverter configured to convert the DC power into the output AC power and provide the output AC power to the output; and
   a controller configured to operate the inverter to introduce a voltage droop to the output AC power, wherein the controller includes an active power droop controller coupled to the inverter output, the active power droop controller including:

a first moving average filter configured to sample instantaneous active power of the inverter to obtain instantaneous active power samples and calculate a first DC component of the instantaneous active power samples; and a first Min-Max filter configured to receive the first DC component of the instantaneous active power samples from the first moving average filter and output a second DC component of the instantaneous active power samples having a convergence time less than a convergence time of the first DC component, wherein the active power droop controller is configured to calculate the voltage droop based on the second DC component.

2. The UPS system of claim 1, wherein the controller is further configured to operate the inverter to introduce a frequency droop to the output AC power, wherein the controller includes a reactive power droop controller coupled to the inverter output, the reactive power droop controller including:

a second moving average filter configured to sample instantaneous reactive power of the inverter to obtain instantaneous reactive power samples and calculate a first DC component of the instantaneous reactive power samples; and a second Min-Max filter configured to receive the first DC component of the instantaneous reactive power samples from the second moving average filter and output a second DC component of the instantaneous reactive power samples having a convergence time less than a convergence time of the first DC component from the second moving average filter, and wherein the reactive power droop controller is configured to calculate the frequency droop based on the second DC component of the second Min-Max filter.

3. The UPS system of claim 2, wherein the controller further includes a voltage reference generation module configured to generate a sine wave signal and a cosine wave signal based on a first DC reference signal corresponding to a base frequency reference and a second DC reference signal corresponding to a base peak voltage reference.

4. The UPS system of claim 3, wherein the active power droop controller is further configured to calculate the instantaneous active power samples based on the sine wave signal received from the reference generation module and instantaneous current measured at the inverter output.

5. The UPS system of claim 4, wherein the active power droop controller is further configured to:

calculate an active power droop coefficient based on a desired voltage droop and a rated active power output of the inverter; and calculate the voltage droop by multiplying the second DC component of the instantaneous active power samples by the active power droop coefficient.

6. The UPS system of claim 4, wherein the reactive power droop controller is further configured to calculate the instantaneous reactive power samples based on the cosine wave signal received from the reference generation module and the instantaneous current measured at the inverter output.

7. The UPS system of claim 6, wherein the reactive power droop controller is further configured to:

calculate a reactive power droop coefficient based on a desired frequency droop and a rated reactive power output of the inverter; and calculate the frequency droop by multiplying the second DC component of the instantaneous reactive power samples by the reactive power droop coefficient.

8. The UPS system of claim 6, wherein the controller is further configured to introduce a virtual output resistance to the output.

9. The UPS system of claim 8, wherein in introducing the virtual output resistance to the output the controller is further configured to:

calculate an instantaneous voltage drop of the inverter based on instantaneous current measured at the output of the UPS and a virtual resistance value; and subtract the instantaneous voltage drop from the sine wave signal.

10. The UPS system of claim 8, wherein the controller further includes a drop compensation controller configured to compensate the output AC power for distortion due to a nonlinear load coupled to the output.

11. The UPS system of claim 10, wherein in compensating the output AC power for distortion due to a nonlinear load, the drop compensation controller is further configured to:

store an instantaneous sampled inverter output voltage error in a buffer over a complete fundamental cycle; and add the stored error voltage to the sine wave signal in a subsequent fundamental cycle.

12. The UPS system of claim 6, wherein the controller further includes a circulating current prevention controller configured to minimize DC circulating current of the inverter.

13. The UPS system of claim 6, further comprising a DC bus coupled to the converter and configured to receive the DC power from the converter, wherein the controller further includes a reverse power prevention controller configured to:

monitor the DC bus for an overvoltage condition; and in response to identifying the overvoltage condition on the DC bus, add an overvoltage offset to the sine wave signal.

14. The UPS system of claim 6, wherein the controller further includes an output synchronization module configured to turn on the inverter and, in response to turning on the inverter, synchronize the inverter to a load bus coupled to the output.

15. A method for operating a UPS system comprising an input configured to be coupled to a power source, an output, a DC bus, and an inverter coupled to the DC bus, the method comprising:

receiving input power from the power source;

maintaining DC power on the DC bus;

converting, with the inverter, the DC power from the DC bus into output AC power;

providing the output AC power to the output; and introducing a voltage droop and a frequency droop to the output AC power, wherein introducing the voltage droop and the frequency droop to the output AC power includes:

sampling instantaneous active power of the inverter to obtain instantaneous active power samples;

calculating a first DC component of the instantaneous active power samples; filtering the first DC component of the instantaneous active power samples to generate a second DC component of the instantaneous active power samples, the second DC component of the instantaneous active power samples having a convergence time less than that of the first DC component of the instantaneous active power samples;

calculating the voltage droop based on the second DC component of the instantaneous active power samples;

sampling instantaneous reactive power of the inverter to obtain instantaneous reactive power samples;
calculating a first DC component of the instantaneous reactive power samples;
filtering the first DC component of the instantaneous reactive power samples to generate a second DC component of the instantaneous reactive power samples, the second DC component of the instantaneous reactive power samples having a convergence time less than that of the first DC component of the instantaneous reactive power samples; and
calculating the frequency droop based on the second DC component of the instantaneous reactive power samples.

16. The method of claim 15, further comprising introducing a virtual output resistance to the output.

17. The method of claim 15, further comprising compensating the output AC power for distortion due to a nonlinear load coupled to the output.

18. The method of claim 15, further comprising minimizing DC circulating current of the inverter.

19. The method of claim 15, further comprising:
turning on the inverter; and
in response to turning on the inverter, synchronizing the inverter to a load bus coupled to the output.

20. A parallel UPS system comprising:
an AC input mains bus configured to be coupled to an AC source;
an output bus configured to be coupled to a load;
a plurality of Uninterruptible Power Supplies (UPS), each UPS including:
an input configured to be coupled to the AC input mains bus and to receive input AC power from the AC source;
an output coupled to the output bus and configured to provide output AC power to the load;
a converter coupled to the input and configured to convert the input power into DC power;
a DC bus coupled to the converter and configured to receive the DC power from the converter; and
an inverter coupled to the DC bus and having an inverter output coupled to the output of the UPS, the inverter configured to convert the DC power from the DC bus into the output AC power and provide the output AC power to the output; and
means for introducing a voltage droop and a frequency droop to the output AC power of each UPS by:
filtering a first DC component of instantaneous active power samples of the inverter to generate a second DC component of the instantaneous active power samples, the second DC component of the instantaneous active power samples having a convergence time less than that of the first DC component of the instantaneous active power samples;
calculating the voltage droop based on the second DC component of the instantaneous active power samples;
filtering a first DC component of instantaneous reactive power samples of the inverter to generate a second DC component of the instantaneous reactive power samples, the second DC component of the instantaneous reactive power samples having a convergence time less than that of the first DC component of the instantaneous reactive power samples; and
calculating the frequency droop based on the second DC component of the instantaneous reactive power samples.

* * * * *